US012743188B2

(12) United States Patent
Yamada

(10) Patent No.: US 12,743,188 B2
(45) Date of Patent: Sep. 22, 2026

(54) INFORMATION PROCESSING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Masahiro Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/705,374

(22) Filed: Mar. 27, 2022

(65) Prior Publication Data

US 2023/0078682 A1 Mar. 16, 2023

(30) Foreign Application Priority Data

Sep. 6, 2021 (JP) ................................ 2021-145009

(51) Int. Cl.

*G06F 3/0482* (2013.01)
*G06F 3/04817* (2022.01)
*G06F 3/04847* (2022.01)
*G06F 40/123* (2020.01)
*G06Q 10/0631* (2023.01)

(52) U.S. Cl.

CPC ........ *G06F 3/0482* (2013.01); *G06F 3/04847* (2013.01); *G06F 40/123* (2020.01); *G06Q 10/06316* (2013.01); *G06F 3/04817* (2013.01)

(58) Field of Classification Search

None

See application file for complete search history.

(56) References Cited

U.S. PATENT DOCUMENTS

| | | | | |
|---|---|---|---|---|
| 5,572,648 | A | 11/1996 | Bibayan | |
| 8,953,191 | B2 * | 2/2015 | Fukuda | H04N 1/32101 358/1.14 |
| 11,863,718 | B2 | 1/2024 | Maruyama | |
| 2006/0259524 | A1 * | 11/2006 | Horton | G06F 16/00 |
| 2007/0220068 | A1 * | 9/2007 | Thompson | G06F 16/1873 707/999.203 |

(Continued)

FOREIGN PATENT DOCUMENTS

| | | |
|---|---|---|
| JP | H06348450 | 12/1994 |
| JP | 2016045770 | 4/2016 |

(Continued)

OTHER PUBLICATIONS

"Notice of Reasons for Refusal of Japan Counterpart Application", issued on Mar. 18, 2025, with English translation thereof, p. 1-p. 8.

(Continued)

*Primary Examiner* — William L Bashore
*Assistant Examiner* — Koorosh Nehchiri
(74) *Attorney, Agent, or Firm* — JCIPRNET

(57) ABSTRACT

An information processing system includes: a reception function of receiving, from a requester, a first instruction section that is used to provide an instruction for a process related to work when a target document to be worked on is transmitted; and a processing function of displaying the first instruction section received from the requester on a work screen on which a worker performs the process related to the work on the target document.

13 Claims, 14 Drawing Sheets

(56) References Cited

U.S. PATENT DOCUMENTS

2007/0240099 A1* 10/2007 Jahn .................... G06Q 10/06 717/104
2009/0222820 A1* 9/2009 Hatakeyama .......... G06Q 10/10 707/999.1
2010/0017435 A1* 1/2010 Anno .................... G06F 40/103 715/250
2010/0070464 A1* 3/2010 Aymeloglu ........... G06F 3/0482 715/764
2010/0238481 A1* 9/2010 Homma ............ H04N 1/00474 358/1.14
2014/0325362 A1* 10/2014 Potts .................... G06F 16/44 715/732
2016/0054906 A1* 2/2016 Suezawa ................ G06F 9/451 715/747
2018/0011829 A1* 1/2018 Suezawa ............... G06F 40/166
2020/0333925 A1* 10/2020 Jung .................... G06F 3/0482
2021/0105376 A1* 4/2021 Maruyama ......... H04N 1/00427
2021/0182030 A1* 6/2021 Jiang .................... G06F 3/0482
2023/0069020 A1* 3/2023 Leginusz ............... G07B 15/02

FOREIGN PATENT DOCUMENTS

JP 2019061588 4/2019
JP 2021060802 4/2021

OTHER PUBLICATIONS

"Decision of Refusal of Japan Counterpart Application", issued on Aug. 12, 2025, with English translation thereof, p. 1-p. 5.
"Notice of Reasons for Refusal of Japan Counterpart Application", issued on Jul. 28, 2026, with English translation thereof,, p. 1-p. 33.

* cited by examiner 10,20
14,24
INPUT SECTION
11,21
COMPUTATION PROCESSING SECTION
11a,21a
CPU
11e,21e
INTERFACE SECTION
11b,21b
RAM
11c,21c
ROM
11d,21d
NON-VOLATILE MEMORY
12,22
SECONDARY STORAGE SECTION
15,25
DISPLAY SECTION
13,23
COMMUNICATION SECTION

T1

| IP ADDRESS | COLOR OF TAG | SHAPE OF STAMP |
|---|---|---|
| xxx.xxx.x.x | #xxxxxx | xxxx |
| yyy.yyy.y.y | #yyyyyy | yyyy |
| zzz.zzz.z.z | #zzzzzz | zzzz |
| ⋮ | ⋮ | ⋮ |

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-145009 filed Sep. 6, 2021.

BACKGROUND

(i) Technical Field

The present disclosure relates to an information processing system, an information processing apparatus, and a non-transitory computer readable medium.

(ii) Related Art

Japanese Unexamined Patent Application Publication No. 6-348450 describes an apparatus and a method that constitute a dynamic tool palette that varies the size, shape, content, etc. in accordance with the context of an applet that is operating, in a container applet that houses other applets etc.

SUMMARY

A requester occasionally transmits a document to a worker via a network to request work, such as editing and approval, on the document. The worker completes the work by executing a process that is suitable for the content of the work on a program including a document processing function, and thereafter storing the document that has been worked on in a designated folder on the network, for example.

In the case where the requester transmits the target document but does not transmit information about the content of the work, however, it is necessary for the worker to select and execute a process that is suitable for the content of the work from among processes provided by the program, which lowers convenience.

Aspects of non-limiting embodiments of the present disclosure relate to providing an information processing system etc. that reduces the trouble taken by a worker to select and execute a process that is suitable for the content of requested work compared to the case where a requester transmits only a target document to be worked on.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: a reception function of receiving, from a requester, a first instruction section that is used to provide an instruction for a process related to work when a target document to be worked on is transmitted; and a processing function of displaying the first instruction section received from the requester on a work screen on which a worker performs the process related to the work on the target document.

BRIEF DESCRIPTION OF THE DRAWINGS

An exemplary embodiment of the present disclosure will be described in detail based on the following figures, wherein:

FIGS. 5A and 5B illustrate an example of an operation screen of the requester terminal, in which FIG. 5A illustrates a state at the time when a document is designated and FIG. 5B illustrates a state at the time when the document is stored in a tray;

FIGS. 6A and 6B illustrate an example of a work screen of the worker terminal, in which FIG. 6A illustrates a state at the time when a document in a tray icon is designated and FIG. 6B illustrates a state at the time when the designated document is opened by a program;

FIGS. 9A and 9B illustrate reception of a designated tool bar from a requester, in which FIG. 9A illustrates an example of display on an operation screen at the time when reception of a designated tool bar is started and FIG. 9B illustrates an example of display on an operation screen at the time when a tool to be added to the designated tool bar is selected;

FIGS. 11A and 11B illustrate addition of a text to a tool icon, in which FIG. 11A illustrates an example of display on an operation screen at the time when a requester adds a text and FIG. 11B illustrates an example of display of a pop-up image on a work screen;

FIGS. 12A and 12B illustrate a completion process according to the present exemplary embodiment, in which FIG. 12A illustrates an example of display on an operation screen at the time when setting for the completion process is made using the requester terminal and FIG. 12B illustrates an example of display on a work screen at the time when the completion process is executed by the worker terminal;

DETAILED DESCRIPTION

An exemplary embodiment (hereinafter referred to as a "present exemplary embodiment") of the present disclosure will be described below with reference to the accompanying drawings.

First, an operation that involves transfer of a document will be described.

Figure 1:
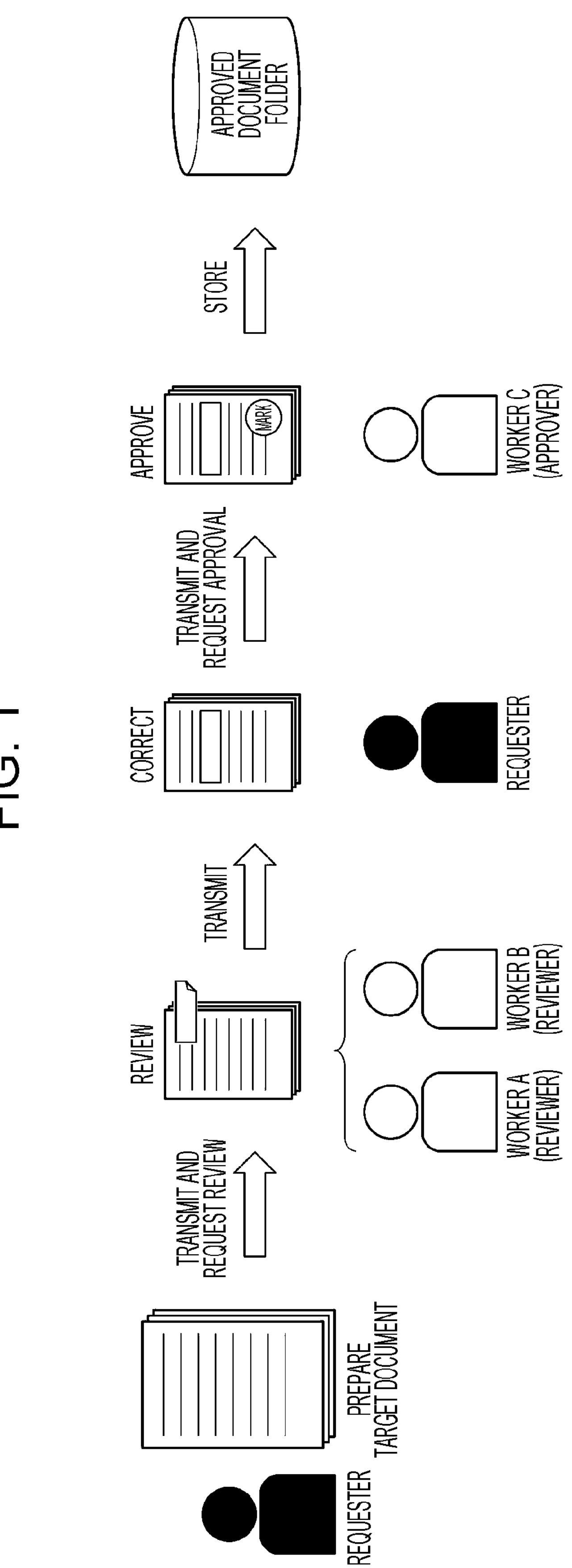
FIG. 1 illustrates an example of the flow of an operation that involves transfer of a document.

FIG. 1 illustrates an example of the flow of an operation that involves transfer of a document. More particularly, FIG. 1 illustrates an example of the flow of an operation for a case where a target document transmitted by a requester is to be reviewed by workers A and B and approved by a worker C.

The term "target document" as used herein refers to an electronic document to be worked on. The electronic document is obtained by digitalizing any information, and the type, format, data structure, etc. of the information are not specifically limited. Hereinafter, the electronic document will occasionally be referred to simply as a "document".

The "requester" is a person that requests a worker to work on the target document. The "worker" is a person that works on the target document in response to a request from the requester.

Further, the "work" is action performed on the target document by the worker. Examples of the "work" include review in which the worker examines the target document. Other examples of the work include approval and decision made by a worker authorized to handle the target document, and editing, copying, printing, distribution, etc. of the target document. In this manner, it is only necessary that the "work" should be action related to the target document, and the type and the content of the "work" are not specifically limited.

Furthermore, the term "transmission" refers to the act of allowing a transmission destination to acquire a document. Examples of the "transmission" include uploading the document to a server that is accessible by the transmission destination, sending the document by mail, and transfer of the document via a storage medium.

In the example in FIG. 1, the requester transmits a prepared target document to the workers A and B who are reviewers, and requests the workers A and B to review the target document. The workers A and B review the target document in response to the request from the requester. More specifically, the workers A and B check the content of the target document, and add a comment, an instruction for correction, etc. Then, the workers A and B transmit the target document that has been reviewed to the requester.

After correcting the target document etc. on the basis of the review, the requester transmits the corrected target document to the worker C, who is an approver, and requests the worker C to approve the target document. The worker C approves the target document in response to the request from the requester. More specifically, the worker C checks the content of the target document, and adds a seal of approval, a signature, etc. if there is no problem.

In this manner, the operation that involves transfer of a document progresses as the workers perform work after the target document is transmitted from the requester to the workers to request the workers to perform work.

[Configuration of Information Processing System 1]

Figure 2:
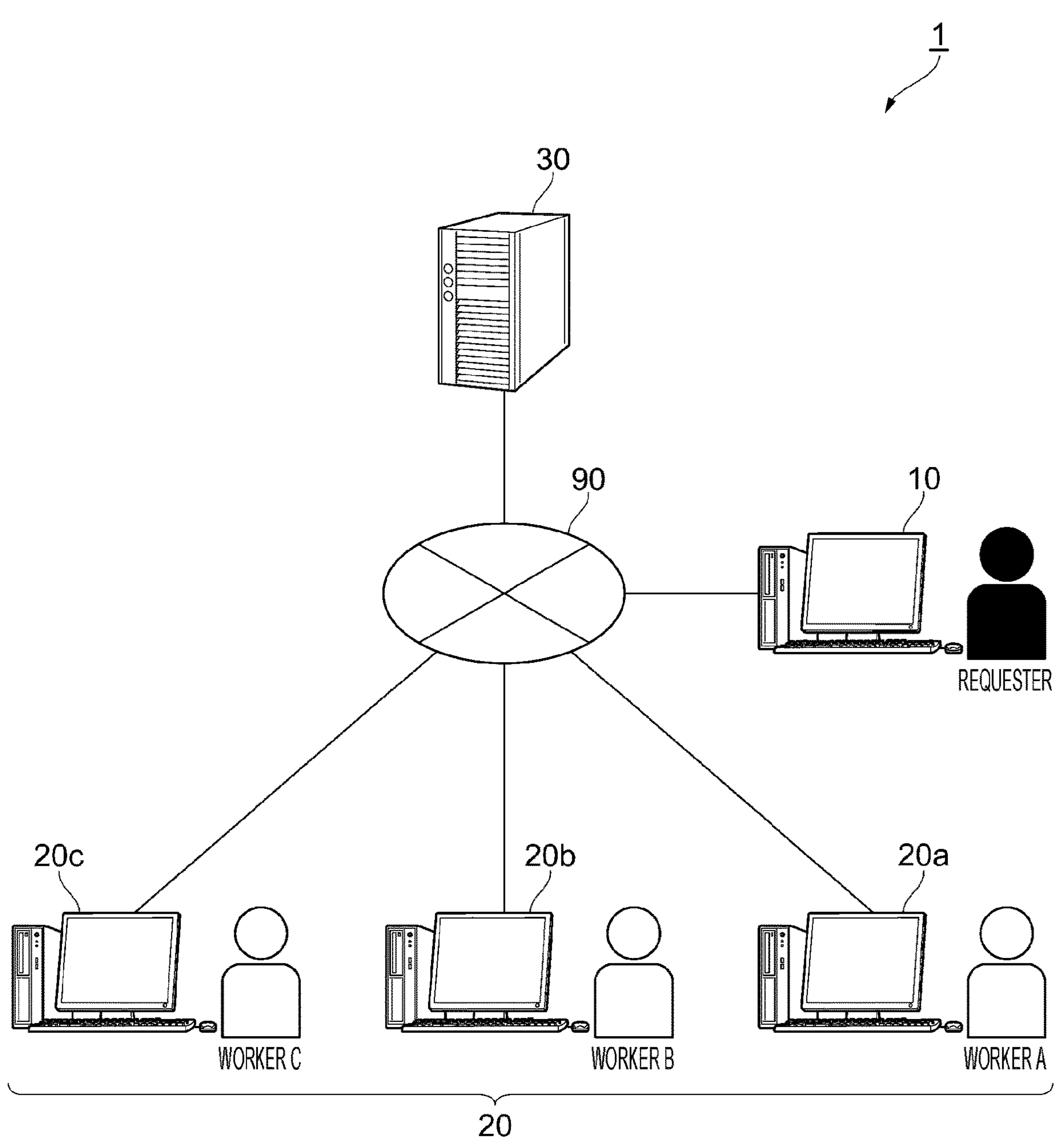
FIG. 2 illustrates an example of the configuration of an information processing system according to the present exemplary embodiment.

FIG. 2 illustrates an example of the configuration of an information processing system 1 according to the present exemplary embodiment.

The information processing system 1 according to the present exemplary embodiment is a system that is used by a requester and workers in an operation that involves transfer of a document such as that described with reference to FIG. 1.

As illustrated in the drawing, the information processing system 1 is constituted by connecting a requester terminal 10, which is used by a requester to transmit a target document, worker terminals 20 (20*a*, 20*b*, 20*c*), which are used by workers to work on the target document, and a server device 30, which provides a storage location for storing the target document, to each other via a communication line 90. The communication line 90 may be a line such as the Internet, for example, and is used for information communication among the requester terminal 10, the worker terminals 20, and the server device 30.

The requester terminal 10 is an information processing apparatus that is used by the requester to transmit the target document in an operation in which the information processing system 1 is used. The requester terminal 10 according to the present exemplary embodiment transmits the target document to the worker terminals 20 by storing the target document in a storage location provided by the server device 30 on the basis of an operation by the requester. Examples of the requester terminal 10 include a personal computer, a tablet terminal, and a smartphone.

The worker terminals 20 are each an information processing apparatus that is used by the workers to work on the target document in an operation in which the information processing system 1 is used. The worker terminals 20 according to the present exemplary embodiment execute a process related to the work on the target document on the basis of an operation by the workers. Examples of the worker terminal 20 include a personal computer, a tablet terminal, and a smartphone.

The server device 30 is an information processing apparatus that provides a storage location for storing documents including the target document in an operation in which the information processing system 1 is used. More particularly, the server device 30 stores documents in a designated storage location on the basis of an instruction from the requester terminal 10 or the worker terminals 20. In addition, the server device 30 transmits the documents to the terminals on the basis of an instruction from the requester terminal 10 or the worker terminals 20. In this manner, the server device 30 enables transmission of the documents via the storage location between the requester terminal 10 and the worker terminals 20.

[Hardware Configuration of Requester Terminal 10]

Figure 3:
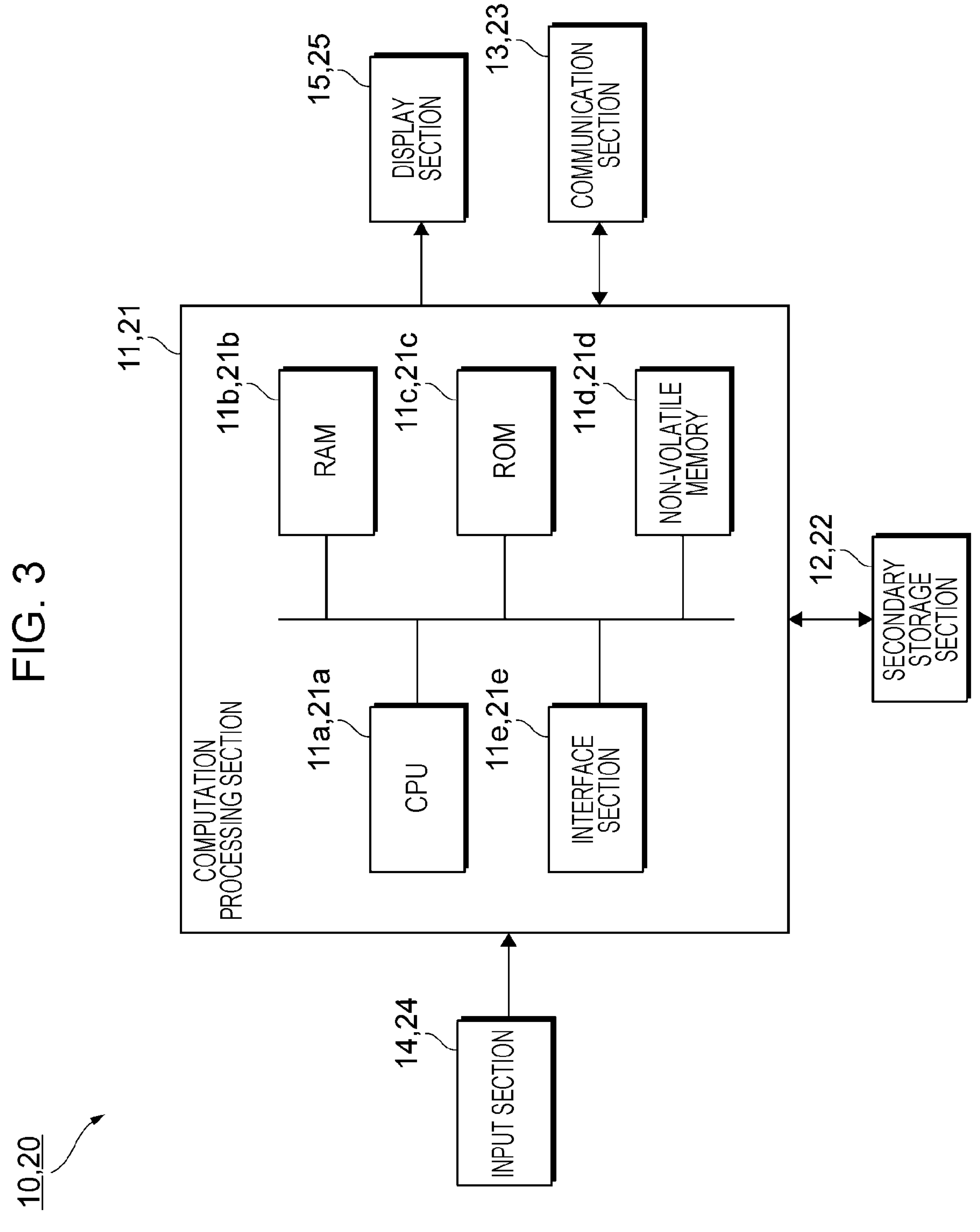
FIG. 3 illustrates an example of the hardware configuration of a requester terminal and worker terminals according to the present exemplary embodiment.

FIG. 3 illustrates an example of the hardware configuration of the requester terminal 10 and the worker terminals 20 according to the present exemplary embodiment.

The requester terminal 10 according to the present exemplary embodiment includes a computation processing section 11 that executes a digital computation process in accordance with a document processing program determined in advance in a process such as transmission of a document, a secondary storage section 12 implemented by a hard disk drive (HDD) etc. to store document data etc., and a communication section 13 that transmits and receives information via the communication line 90. The requester terminal 10 also includes an input section 14, such as a keyboard, a pointing device, and a touch screen, that receives an input operation from a user, and a display section 15, such as a liquid crystal display panel and an organic electro luminescence (EL) display panel, that displays an image, text information, etc. to the user.

The computation processing section 11 includes a central processing unit (CPU) 11*a* that controls the entire apparatus as an example of the processor, a random access memory (RAM) 11*b* that is used as a work memory etc, for the CPU 11*a*, and a read only memory (ROM) 11*c* that stores the document processing program etc. to be executed by the CPU 11*a*. The computation processing section 11 also includes a non-volatile memory 11*d* that is rewritable and that holds data even in the case where power supply is interrupted, and an interface section 11*e* that controls various sections, such as the input section 14, connected to the computation processing section 11. The non-volatile memory 11*d* is constituted from a static RAM (SRAM) backed up by a battery, a flash memory, etc., for example, and stores the result of a process performed on the document to be displayed on the display section 15. The secondary storage section 12 stores document data, the result of a process for the document, etc., and stores the document processing program to be executed by the computation processing section 11. The requester terminal 10 according to the present exemplary embodiment executes various processes by the computation processing section 11 reading the document processing program stored in the secondary storage section 12.

[Hardware Configuration of Worker Terminals 20]

The worker terminals 20 according to the present exemplary embodiment have a hardware configuration that is similar to that of the requester terminal 10. Thus, the components of the terminals are occasionally given identical names but denoted by different reference numerals to omit detailed description. The worker terminals 20 each include a computation processing section 21 that executes a digital computation process in accordance with a document processing program determined in advance in processing a document, a secondary storage section 22 implemented by an HDD etc. to store document data etc., and a communication section 23 that transmits and receives information via the communication line 90. The worker terminals 20 each also include an input section 24 that receives an input operation from a user, and a display section 25 that displays an image, text information, etc. to the user.

The computation processing section 21 includes a CPU 21*a* that controls the entire apparatus as an example of the processor, a RAM 21*b* that is used as a work memory etc. for the CPU 21*a*, and a ROM 21*c* that stores the document processing program etc. to be executed by the CPU 21*a*. The computation processing section 21 also includes a non-volatile memory 21*d* that is rewritable and that holds data even in the case where power supply is interrupted, and an interface section 21*e* that controls various sections, such as the input section 24, connected to the computation processing section 21. The non-volatile memory 21*d* stores the content of a process on the document, for example. The secondary storage section 22 stores document data, the content of a process for the document, etc., and stores the document processing program to be executed by the computation processing section 21. The worker terminals 20 according to the present exemplary embodiment execute various processes by the computation processing section 21 reading the document processing program stored in the secondary storage section 22.

[Hardware Configuration of Server Device 30]

Figure 4:
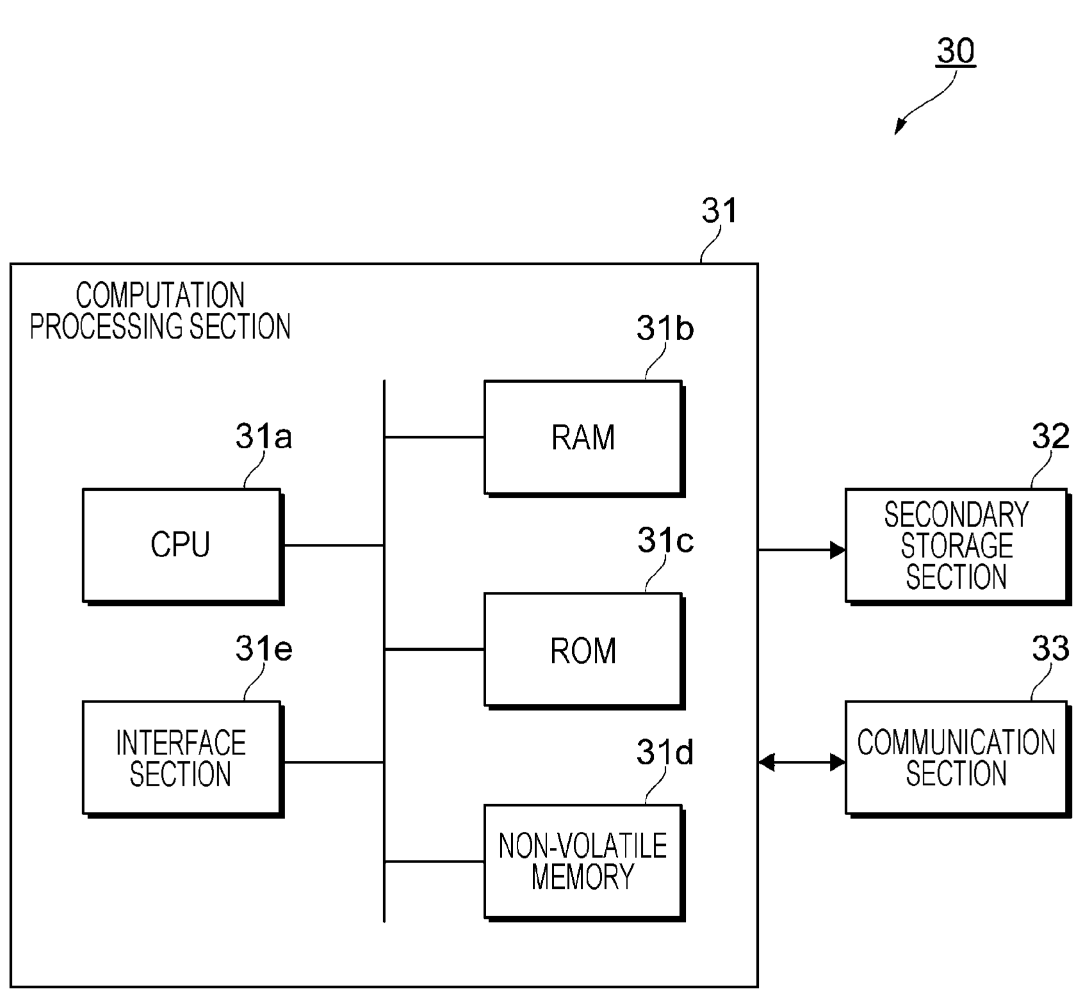
FIG. 4 illustrates an example of the hardware configuration of a server device according to the present exemplary embodiment.

FIG. 4 illustrates an example of the hardware configuration of the server device 30 according to the present exemplary embodiment.

The server device 30 according to the present exemplary embodiment includes a computation processing section 31 that executes a digital computation process in accordance with a document processing program determined in advance in a process such as storage of a document, a secondary storage section 32 implemented by an HDD etc. to store document data etc. to be managed, and a communication section 33 that transmits and receives information via the communication line 90.

The computation processing section 31 includes a CPU 31*a* that controls the entire apparatus as an example of the processor, a RAM 31*b* that is used as a work memory etc. for the CPU 31*a*, and a ROM 31*c* that stores the document management program etc. to be executed by the CPU 31*a*. The computation processing section 31 also includes a non-volatile memory 31*d* that is rewritable and that holds data even in the case where power supply is interrupted, and an interface section 31*e* that controls various sections, such as the communication section 33, connected to the computation processing section 31. The non-volatile memory 31*d* is constituted from an SRAM backed up by a battery, a flash memory, etc., for example, and stores information related to storage of the document etc. The secondary storage section 32 stores document data, information related to storage of the document, etc., and stores the program to be executed by the computation processing section 31. The server device 30 according to the present exemplary embodiment executes various processes by the computation processing section 31 reading the program stored in the secondary storage section 32.

The programs to be executed by the CPUs 11*a*, 21*a*, and 31*a*, which are examples of the processor, are provided to the computation processing sections 11, 21, and 31 as stored in a computer-readable storage medium such as a magnetic storage medium (such as a magnetic tape and a magnetic disk), an optical storage medium (such as an optical disk), a magneto-optical storage medium, and a semiconductor memory. Alternatively, the programs to be executed by the CPUs 11*a*, 21*a*, and 31*a* may be downloaded using a communication unit such as the Internet. The term "processor" refers to hardware in a broad sense. Examples of the processor include general processors such as CPUs and dedicated processors such as graphics processing units (GPUs), field programmable gate arrays (FPGAS), application specific integrated circuits (ASICs), and programmable logic devices.

The term "processor" is broad enough to encompass one processor or plural processors in collaboration which are located physically apart from each other but may work cooperatively. The order of operations of the processor is not limited to the described one, and may be changed.

[Operation Screen 150]

Figure 5A:
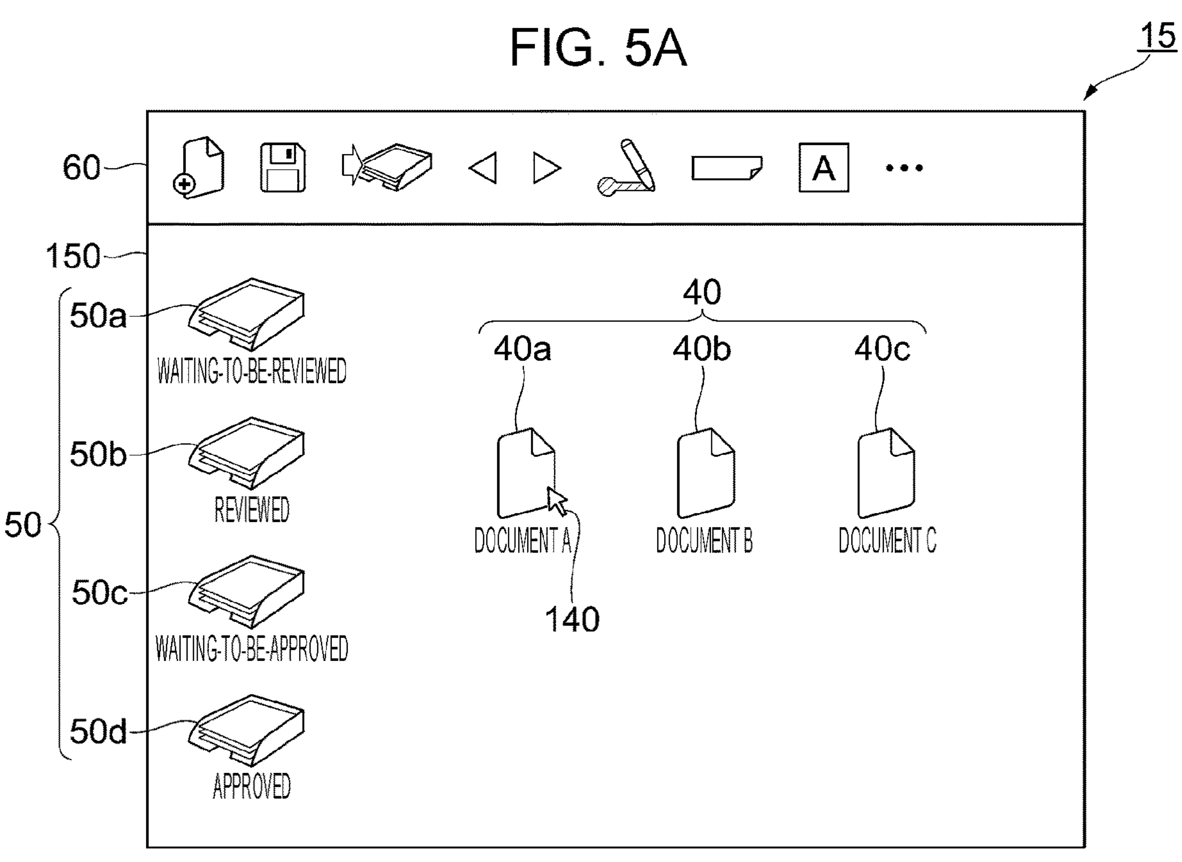
Figure 5B:
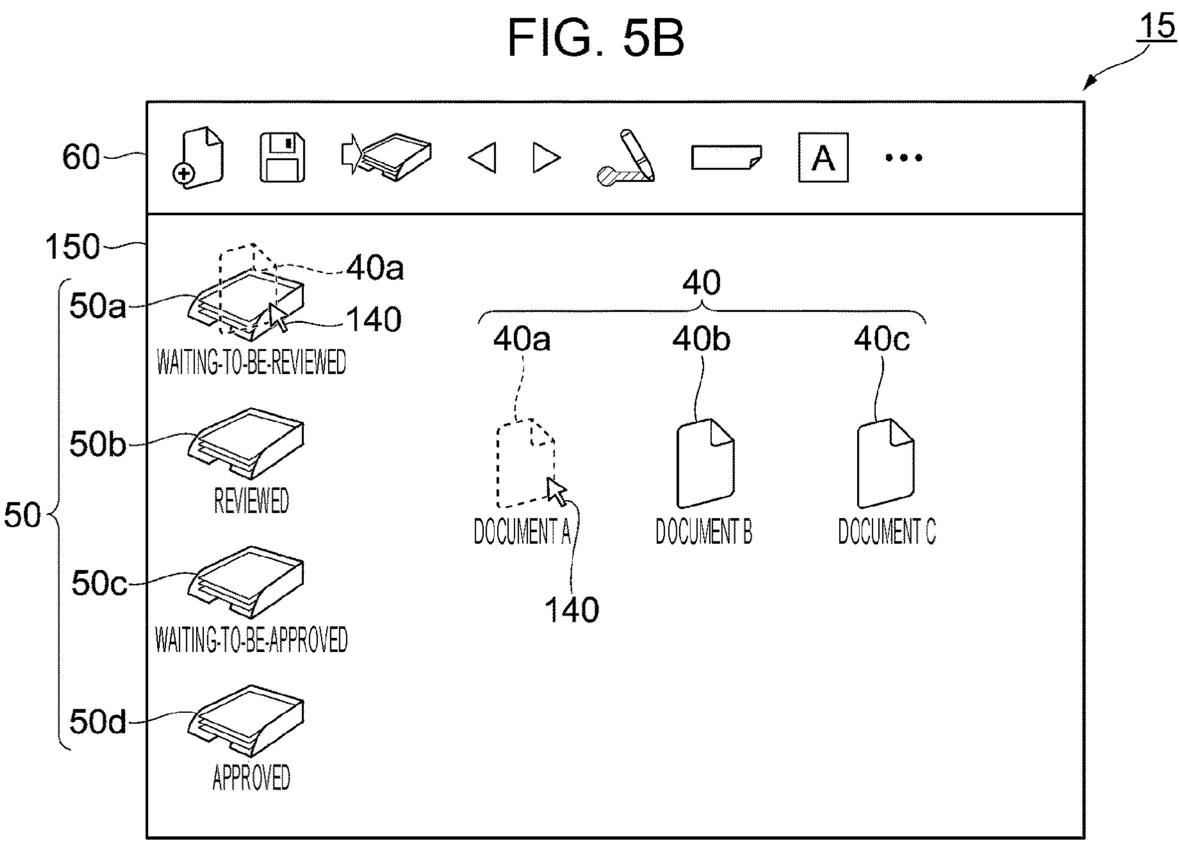

FIGS. 5A and 5B illustrate an example of an operation screen 150 of the requester terminal 10, in which FIG. 5A illustrates a state at the time when a document is designated and FIG. 5B illustrates a state at the time when the document is stored in a tray.

The display section 15 of the requester terminal 10 according to the present exemplary embodiment displays a cursor 140 that points to a position, an image, etc. on the screen, and an operation screen 150 that includes a work space on so-called document handling software and a default tool bar 60.

The cursor 140 is moved in accordance with an operation by the requester input via the input section 14, and displayed so as to point to a position, an image, etc. on the screen designated by the user.

The document handling software is software that digitalizes and manages a document formed on a paper medium, and has a function of promoting consolidated management of paper and electronic documents.

The "work space" in the present exemplary embodiment is an area in which document icons 40, tray icons 50, etc. that receive instructions for the documents from the user are disposed. The work space also functions as an area in which the content of a document is displayed in the case where the document is opened for viewing, editing, etc.

The document icons 40 (40*a*, 40*b*, 40*c*) are icons that receive instructions for the documents from the user. The "icons" are pictorial and symbolic representations of various functions such as a program function, and are images that are used to receive instructions for the corresponding functions from the user. The instructions to be received by the document icons 40 include instructions to designate a document, to change the saving location or the storage location, to change the display position of an icon, to open a document, etc. The document icons 40*a*, 40*b*, and 40*c* illustrated in FIG. 5 correspond to different documents A, B, and C, respectively.

The default tool bar 60 is a default tool bar prepared as a standard by the software provider etc. in the document handling software according to the present exemplary embodiment. The "tool bar" includes one or a plurality of tool icons that are used to provide an instruction to execute various processes (tools) that are executable in the software, and is an example of the instruction section that receives an instruction from the user. The user is allowed to provide an instruction to execute a corresponding process by performing an operation to designate a tool icon provided in the default tool bar 60.

The type of the tool icons provided in the default tool bar 60 is not specifically limited. For example, tool icons that are used to provide an instruction for a process of creating a new document, a process of saving a document, etc. may be provided. The type of the icons and the content of the corresponding processes may be changeable on the basis of an instruction from the user.

The tray icons 50 (50*a*, 50*b*, 50*c*, 50*d*) are icons that are used to receive instructions from the user related to the storage location provided by the server device 30. The instructions to be received by the tray icons 50 include instructions to store a document in a corresponding storage location, to display a list of document icons corresponding to stored documents, etc. The tray icons 50*a*, 50*b*, 50*c*, and 50*d* illustrated in FIG. 5 are icons that receive instructions related to a waiting-to-be-reviewed document folder 321, a reviewed document folder 322, a waiting-to-be-approved document folder 323, and an approved document folder 324 (which will be discussed later with reference to FIG. 7), which are different storage locations.

The tray icons 50 receive an operation to designate a tray icon 50 with a document icon 40 designated, for example, as an instruction to store a document in a corresponding storage location. In a more specific example, as illustrated in FIG. 5B, an operation (drag and drop) to designate and move the document icon 40*a* onto the tray icon 50*a* is received as an instruction to store the document A in the waiting-to-be-reviewed document folder 321.

In the requester terminal 10 according to the present exemplary embodiment, in addition, the tray icons 50 receive a designated tool bar 70 for a corresponding storage location from the requester who is a user, as discussed in detail later. For example, the tray icon 50*a* receives the designated tool bar 70 for the waiting-to-be-reviewed document folder 321.

"Receiving the designated tool bar 70" refers to receiving any setting about the designated tool bar 70.

[Work Screen 250]

Figure 6A:
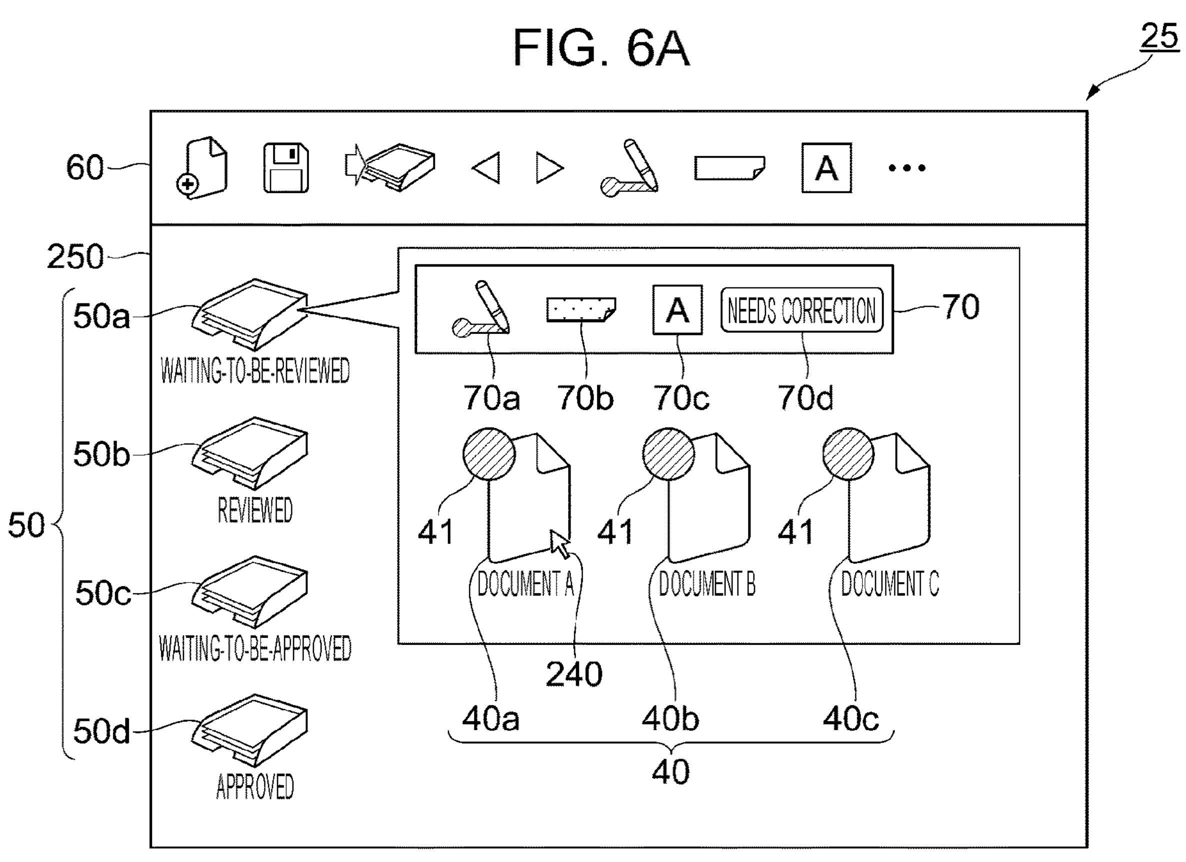
Figure 6B:
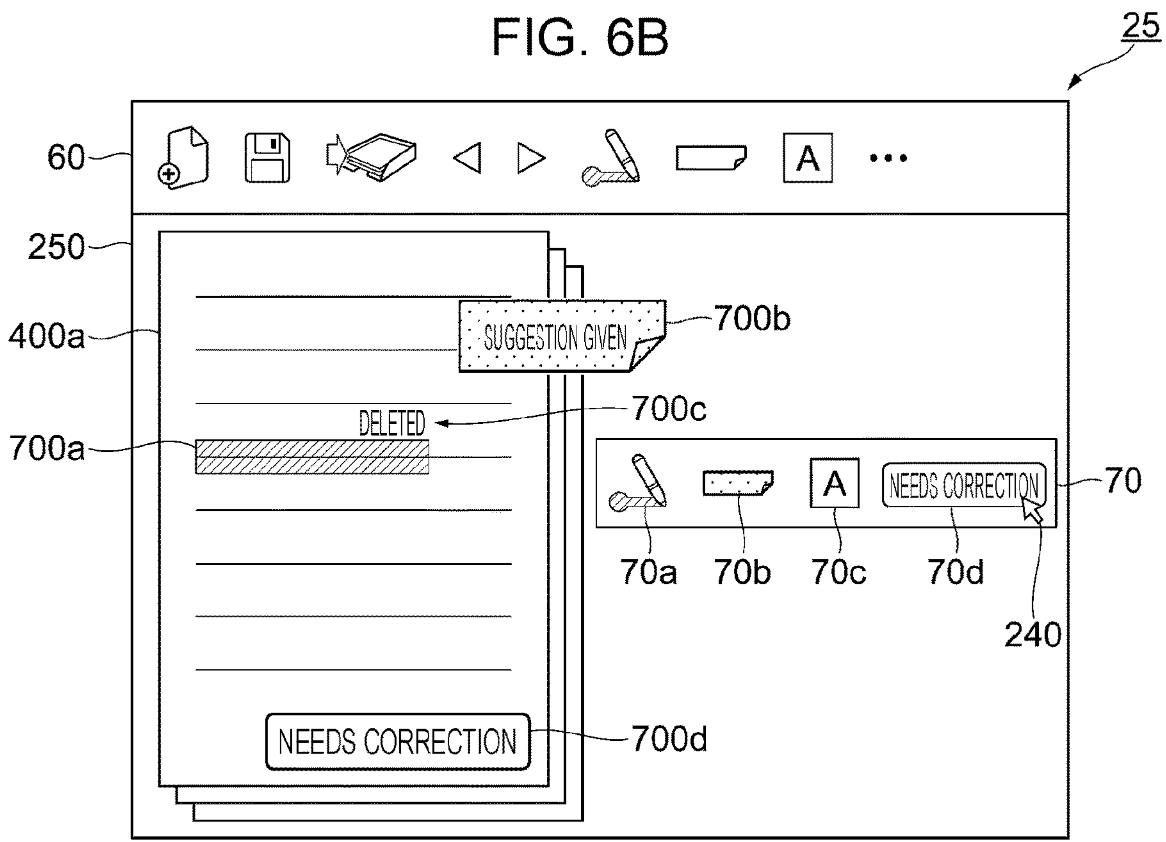

FIGS. 6A and 6B illustrate an example of a work screen 250 of the worker terminal 20, in which FIG. 6A illustrates a state at the time when a document in the tray icon 50*a* is designated and FIG. 6B illustrates a state at the time when the designated document is opened by a program.

The display section 25 of the worker terminal 20 according to the present exemplary embodiment displays a cursor 240 that points to a position, an image, etc. on the screen, and a work screen 250 that allows the worker who is the user to perform the process related to the work. Components that are similar to those of the requester terminal 10 illustrated in FIG. 5 are given identical reference numerals to occasionally omit description.

A work space in which the tray icons 50 are disposed and the default tool bar 60 are displayed on the work screen 250. In the case where the user performs an operation to designate the tray icon 50*a*, for example, on the work screen 250, a list of the document icons 40 corresponding to the documents stored in the waiting-to-be-reviewed document folder 321 is displayed, and the designated tool bar 70 received from the requester is displayed, as illustrated in FIG. 6A. In addition, badge images 41 are displayed in association with the document icons 40.

In the case where the user performs an operation to designate the document icon 40*a* and open the document A, the content of display in the work space is varied as illustrated in FIG. 6B. More particularly, a page image 400*a* corresponding to information on at least one page of the document A is displayed together with the designated tool bar 70.

The badge images 41 are images displayed in association with the document icons 40*a* to 40*c*, and indicate that the designated tool bar 70 that is used to provide an instruction for a process related to the work on the documents A to C has been received from the requester. While the badge images 41 are displayed in the example in FIG. 6A, this is not limiting. Any information that indicates that the designated tool bar 70 has been received, such as icons and texts, may be displayed in association with the document icons 40.

The page image 400*a* is an image that corresponds to information on at least one page of the document A, and that indicates the content of the relevant page in a viewable manner. In the case where the document A includes a plurality of pages, a page image 400*a* corresponding to the page desired to be viewed may be displayed by page forward/backward operations determined in advance.

The page image 400*a* according to the present exemplary embodiment also functions as an image that receives addition and deletion of information to and from the relevant page of the document A. For example, in the case where the user affixes information such as texts and images by designating a position on the page image 400*a*, a process of adding the affixed information to the relevant position on the relevant page of the document A is performed.

In the present exemplary embodiment, "opening" the document A indicates displaying the page image 400*a* to allow viewing of the content of the document A and addition and deletion of information to and from the document A.

As illustrated in FIGS. 6A and 6B, the designated tool bar 70 received from the requester is displayed on the work screen 250. The designated tool bar 70 is a tool bar that is used to provide an instruction for a process related to the work on the target document. When any tool icon is designated, a process corresponding to the designated tool icon is executed on the target document.

In the example in FIGS. 6A and 6B, the designated tool bar 70 includes a tool icon 70*a* corresponding to a marker process, a tool icon 70*b* corresponding to a tagging process, a tool icon 70*c* corresponding to a text insertion process, and a tool icon 70*d* corresponding to an image affixation process.

The worker is allowed to work on the document A as the target document by displaying the page image 400*a* as illustrated in FIG. 6B and providing an instruction for various processes using the designated tool bar 70.

For example, a marker process in which a marker line 700*a* is applied to a selected region is performed by selecting a part of a region of the page image 400*a* and designating the tool icon 70*a*.

In addition, a tagging process in which a tag image 700*b* is applied to a page to which it is desired to apply a tag is performed by designating the tool icon 70*b* with a page image 400*a* corresponding to the relevant page displayed. A text may be applied to the tag image 700*b* as illustrated in the drawing.

Further, a text insertion process (text annotation) in which a text is inserted at a position on the page image 400*a* is performed by designating the tool icon 70*c* and selecting the relevant position.

Furthermore, a stamp affixation process in which a stamp image 700*d* determined in advance is affixed at a position on the page image 400*a* is performed by designating the tool icon 70*d* and selecting the relevant position. The stamp affixation process may be used as a stamp such as "needs correction" or a seal such as an approval seal for paper documents.

While an instruction for a process of adding a so-called annotation as a process for the target document is provided in the example in FIGS. 6A and 6B, the type of the process instructed using the designated tool bar 70 is based on the setting received from the requester, and is not limited.

An instruction for a process provided using the designated tool bar 70 may be provided when the target document is not opened. For example, it is not necessary that the page image 400*a* should be displayed in the case where a printing process is performed as work on the target document. In such a case, the document A is printed by designating a "print" tool icon (not illustrated) in the designated tool bar 70 with the document icon 40*a* selected in FIG. 6A, for example.

The designated tool bar 70 according to the present exemplary embodiment is an instruction section that is used to provide an instruction for a process related to the work received from the requester, and that is displayed on the work screen 250, and is an example of the first instruction section.

Meanwhile, the default tool bar 60 according to the present exemplary embodiment is an instruction section that is different from the designated tool bar 70, and is an example of the second instruction section.

[Functional Configuration of Devices]

Figure 7:
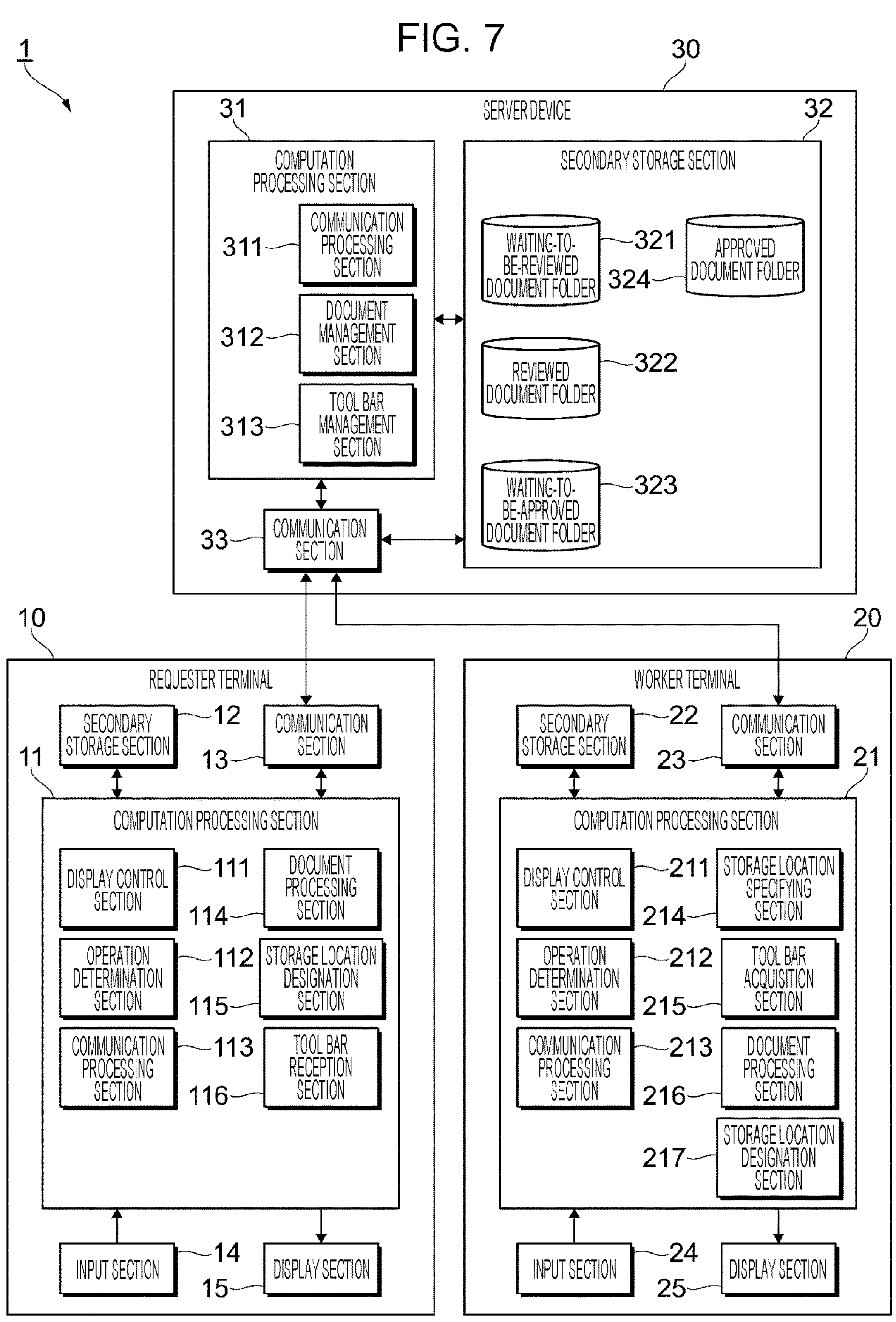
FIG. 7 illustrates an example of the functional configuration of devices provided in the information processing system.

FIG. 7 illustrates an example of the functional configuration of the devices provided in the information processing system 1.

As illustrated in the drawing, the requester terminal 10 includes a display control section 111 that controls a content to be displayed on the display section 15, an operation determination section 112 that determines a user operation, a communication processing section 113 that transmits and receives information, a document processing section 114 that processes a document, a storage location designation section 115 that receives designation of the storage location for the document, and a tool bar reception section 116 that receives the designated tool bar 70.

The display control section 111 controls a content to be displayed on the display section 15 on the basis of a user operation determined by the operation determination section 112, information received via the communication processing section 113, and the content of the process performed on the document by the document processing section 114.

The operation determination section 112 determines what user operation has been performed on the operation screen 150 via the input section 14. Examples of the user operation include an operation such as clicking to designate images, various icons, positions, etc. on the operation screen 150, a scroll operation, and a key input operation.

The communication processing section 113 performs a process related to transmission and reception of information via the communication section 13. For example, the communication processing section 113 transmits the target document stored in the secondary storage section 12 to the server device 30. In addition, the communication processing section 113 receives a document transmitted from the server device 30, and stores the document in the secondary storage section 12, for example.

The document processing section 114 processes a document on the basis of the result of the determination by the operation determination section 112 etc. For example, the document processing section 114 executes a corresponding process, such as creating a new document and deleting and editing a document, on the basis of an operation performed to designate a tool icon provided in the default tool bar 60.

The storage location designation section 115 receives designation of the storage location for the document on the basis of the result of the determination by the operation determination section 112 etc. For example, the storage location designation section 115 receives an indication that the waiting-to-be-reviewed document folder 321 has been designated as the storage location for the document A in the case where an operation to select the tray icon 50*a* is performed with the document A designated. In addition, in the case where an instruction for a process of storing the target document in the designated storage location is provided using the default tool bar 60, the storage location designation section 115 receives such designation, for example.

The tool bar reception section 116 receives the designated tool bar 70 from the requester who is the user. More particularly, the tool bar reception section 116 receives setting about the designated tool bar 70, which is a tool bar that is displayed on the work screen 250 of the worker terminal 20 and that is used to provide an instruction for a process related to the work on the target document. As discussed in detail later with reference to FIGS. 8, 9A and 9B, 10, 11A and 11B, and 12A and 12B, the tool bar reception section 116 receives, as setting about the designated tool bar 70, designation of the type and the mode of tools, designation of an attribute value to be used in a process, addition of information such as a text to the designated tool bar 70, etc.

The tool bar reception section 116 according to the present exemplary embodiment receives the designated tool bar 70 for the storage location provided by the server device 30. For example, the tool bar reception section 116 receives the designated tool bar 70 for the waiting-to-be-reviewed document folder 321 in the case where an operation to set the designated tool bar 70 to the tray icon 50*a* is performed on the operation screen 150 of the requester terminal 10.

In this manner, the requester terminal 10 achieves the function of receiving the designated tool bar 70, which is used to provide an instruction for a process related to the work, as the reception function according to the present exemplary embodiment.

The worker terminal 20 includes a display control section 211 that controls a content to be displayed on the display section 25, an operation determination section 212 that determines a user operation, a communication processing section 213 that transmits and receives information, a storage location specifying section 214 that specifies the storage location for the target document, a tool bar acquisition section 215 that acquires the designated tool bar 70, a document processing section 216 that processes the document, and a storage location designation section 217 that receives designation of the storage location for the document.

The display control section 211 controls a content to be displayed on the display section 25 on the basis of a user operation determined by the operation determination section 212, information received via the communication processing section 213, and the content of the process performed on the document by the document processing section 216. In addition, the display control section 211 performs control so as to display the designated tool bar 70 on the basis of an instruction from the tool bar acquisition section 215, for example.

The operation determination section 212 determines what user operation has been performed on the work screen 250 via the input section 24. For example, the operation determination section 212 determines that an operation to designate a tool icon provided in the designated tool bar 70 has been performed, for example.

The communication processing section 213 performs a process related to transmission and reception of information via the communication section 23. For example, the communication processing section 213 transmits the document stored in the secondary storage section 22 to the server device 30. In addition, the communication processing section 213 receives the target document from the storage location provided by the server device 30, and stores the target document in the secondary storage section 22, for example.

The storage location specifying section 214 specifies which storage location the acquired target document has been stored in. For example, in the case where the communication processing section 213 receives the document A which is the target document from the server device 30, the storage location specifying section 214 specifies that the document A has been stored in the waiting-to-be-reviewed document folder 321. The storage location is specified on the basis of storage location information (to be discussed later) received together with the target document, for example.

The tool bar acquisition section 215 acquires the designated tool bar 70 that is used to provide an instruction for a process related to the work on the target document. More particularly, the tool bar acquisition section 215 requests the designated tool bar 70 which is set to the storage location specified by the storage location specifying section 214 from the server device 30, and acquires the designated tool bar 70.

In this manner, the worker terminal 20 achieves the function of displaying the designated tool bar 70 received from the requester on the work screen 250 as the processing function according to the present exemplary embodiment.

The document processing section 216 processes a document on the basis of the result of the determination by the operation determination section 212 etc. For example, the document processing section 216 executes a process related to the work on the target document on the basis of an operation performed to designate the tool icons 70*a* to 70*d* provided in the designated tool bar 70.

The storage location designation section 217 receives designation of the storage location for the document on the basis of the result of the determination by the operation determination section 212 etc. For example, in the case where an instruction for a process of storing the target document in the designated storage location is provided using the designated tool bar 70, the storage location designation section 217 receives such designation.

The server device 30 includes a communication processing section 311 that transmits and receives information, a document management section 312 that manages documents, a tool bar management section 313 that manages the received designated tool bar 70, and folders 321, 322, 323, and 324 that serve as the storage locations for the documents.

The communication processing section 311 performs a process related to transmission and reception of information via the communication section 33. For example, the communication processing section 311 transmits and receives a document to and from the requester terminal 10 or the worker terminals 20 on the basis of an instruction from the document management section 312. In addition, the communication processing section 311 receives the designated tool bar 70 from the requester terminal 10. Further, the communication processing section 311 transmits the designated tool bar 70 to the worker terminal 20 on the basis of an instruction from the tool bar management section 313.

The document management section 312 manages documents stored in the secondary storage section 32 and documents received from other devices. For example, the document management section 312 retrieves a designated document from the secondary storage section 32 in the case where a request for the document is received from the worker terminal 20. Then, the document management section 312 instructs the communication processing section 311 to transmit the relevant document to the worker terminal 20. In addition, in the case where designation of a document and a storage location is received from the requester terminal 10, the document management section 312 stores the relevant document in the designated storage location, for example. In this event, the document management section 312 adds storage location information that indicates which storage location the document is stored in to the relevant document.

The tool bar management section 313 manages the received designated tool bar 70. More particularly, the tool bar management section 313 generates reception information that indicates which storage location the designated tool bar 70 has been received at in the case where the communication processing section 311 has received the designated tool bar 70. In addition, the tool bar management section 313 retrieves the designated tool bar 70 at the storage location for the target document on the basis of the reception information in the case where the designated tool bar 70 is requested from the worker terminal 20. Then, the tool bar management section 313 instructs the communication processing section 311 to transmit the retrieved designated tool bar 70 to the worker terminal 20.

The waiting-to-be-reviewed document folder 321, the reviewed document folder 322, the waiting-to-be-approved document folder 323, and the approved document folder 324 are storage locations provided by the secondary storage section 32 in order to store documents received from the requester terminal 10 or the worker terminals 20. In addition, the folders 321, 322, 323, and 324 according to the present exemplary embodiment also function as storage locations that are used to store the designated tool bar 70 set for each of the folders.

In this manner, the server device 30 according to the present exemplary embodiment implements a storage function of providing a storage location for storing a document.

[Operation of Information Processing System 1]

Next, operation of the information processing system 1 performed in an operation that involves transfer of a document will be described with reference to FIGS. 5A and 5B, 6A and 6B, 7, 8, 9A and 9B, 10, and 11A and 11B. In the example to be described here, as in FIG. 1, the target document transmitted by the requester is to be reviewed by the workers A and B and approved by the worker C.

Figure 8:
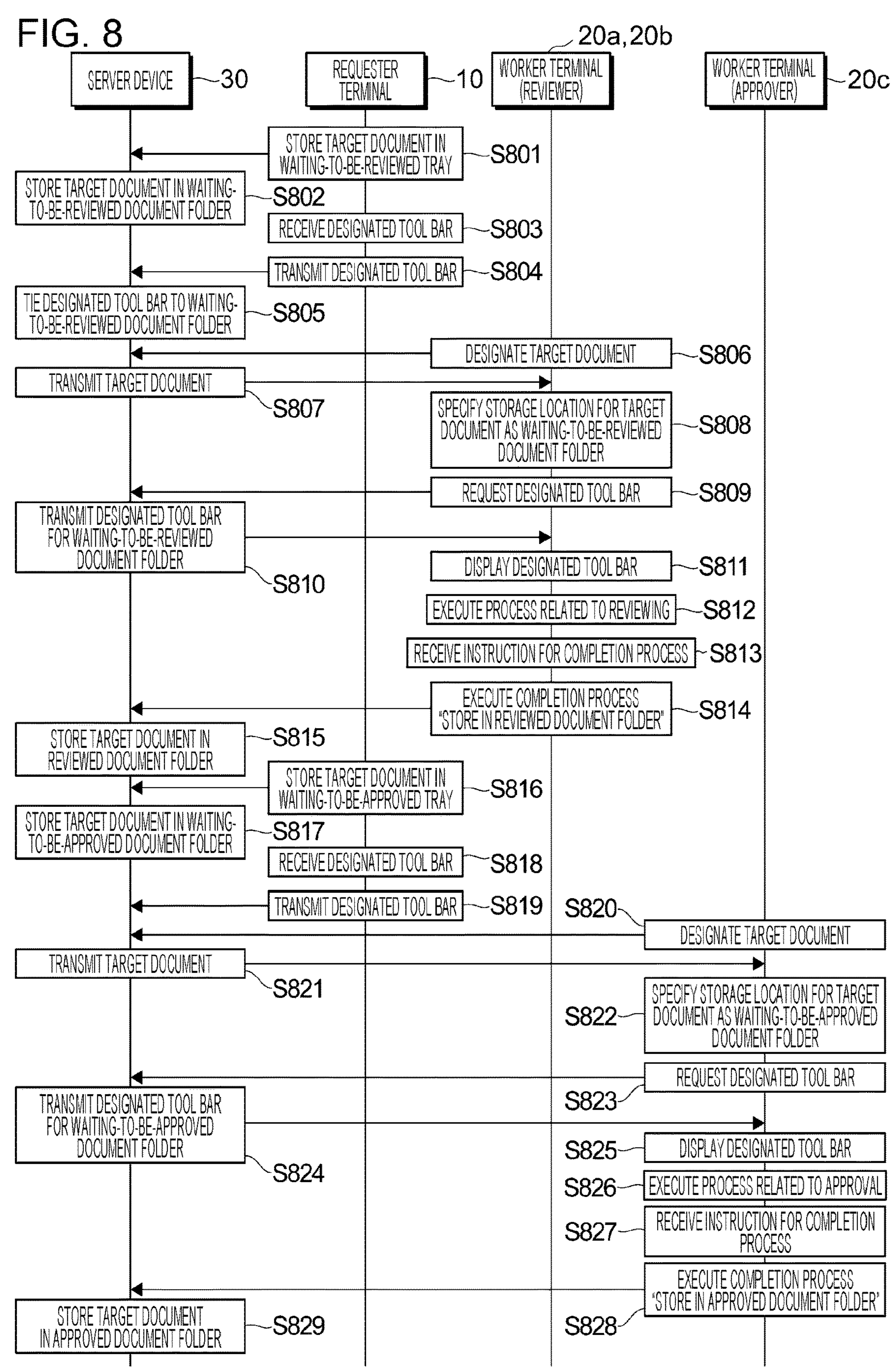
FIG. 8 is a sequence chart illustrating an example of the procedures for operation of the information processing system.

FIG. 8 is a sequence chart illustrating an example of the procedures for operation of the information processing system 1.

Figure 9A:
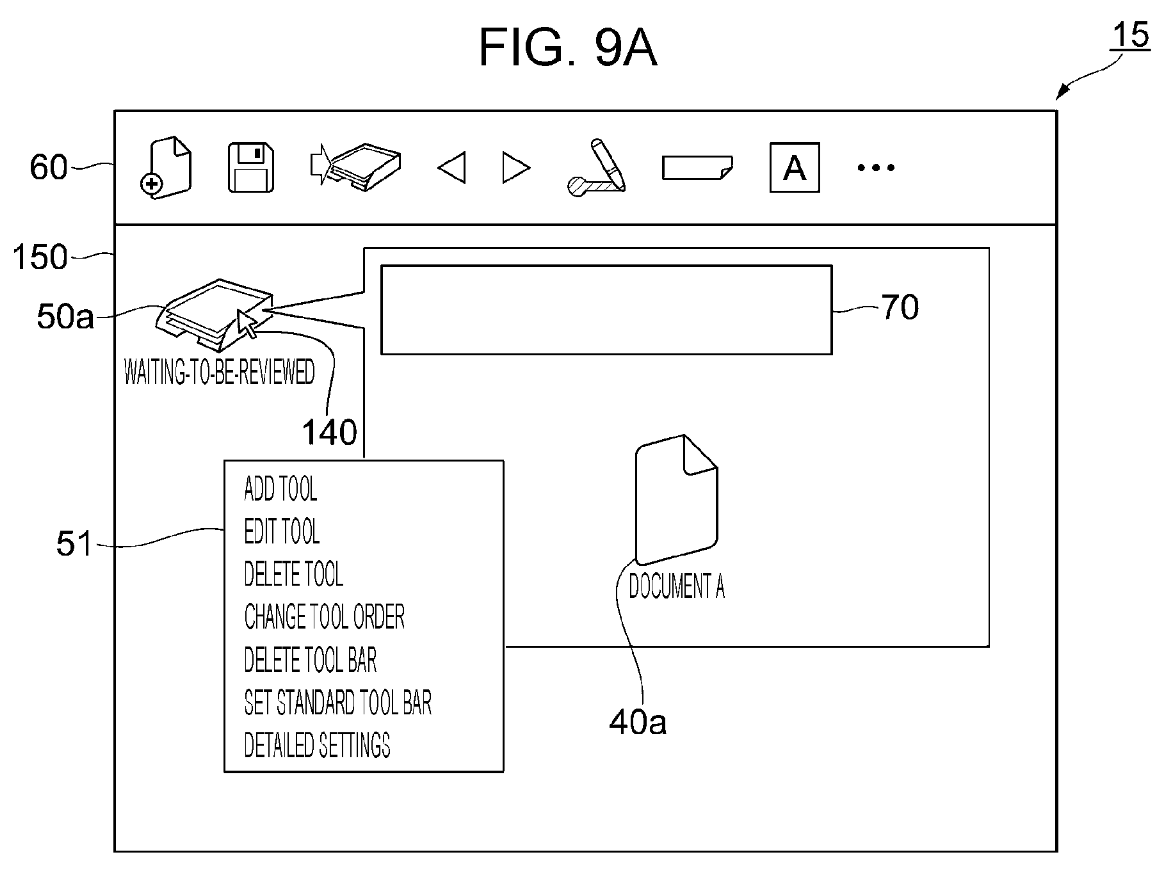
Figure 9B:
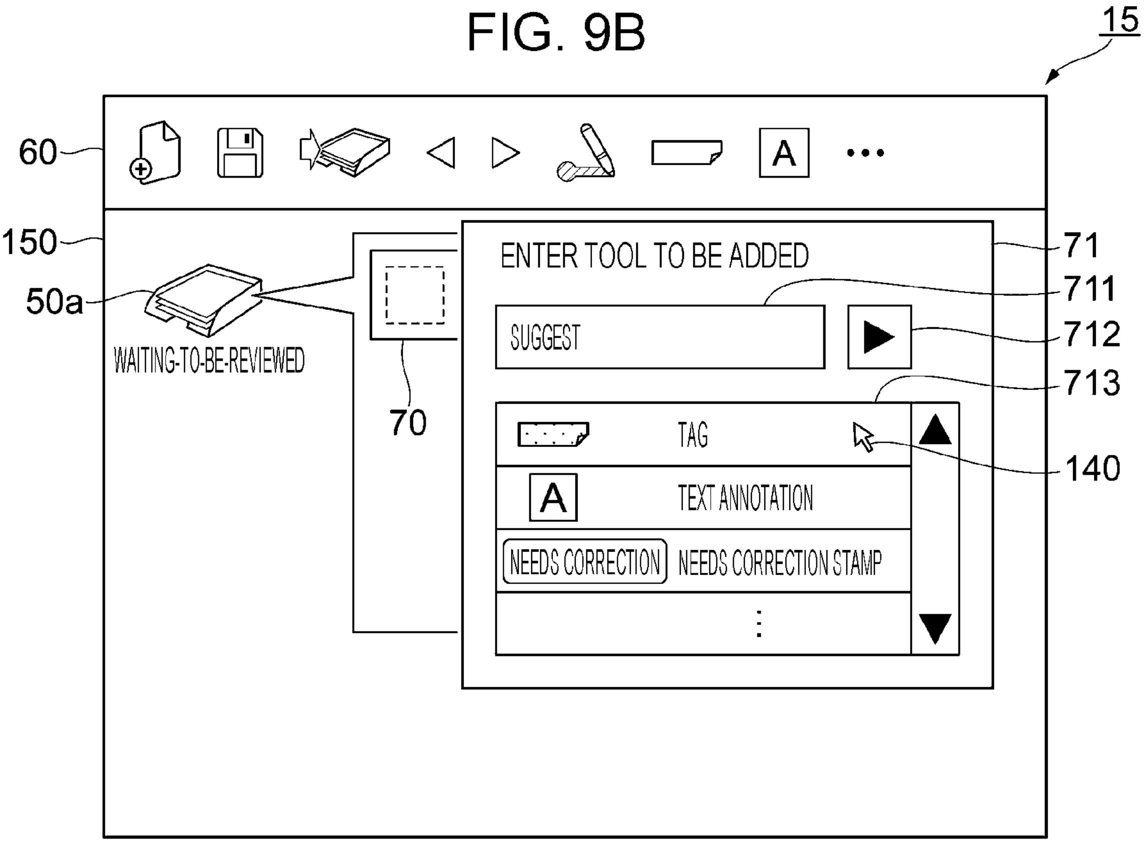

FIGS. 9A and 9B illustrate reception of the designated tool bar 70 from the requester, in which FIG. 9A illustrates an example of display on the operation screen 150 at the time when reception of the designated tool bar 70 is started and FIG. 9B illustrates an example of display on the operation screen 150 at the time when a tool to be added to the designated tool bar 150 is selected.

Figure 10:
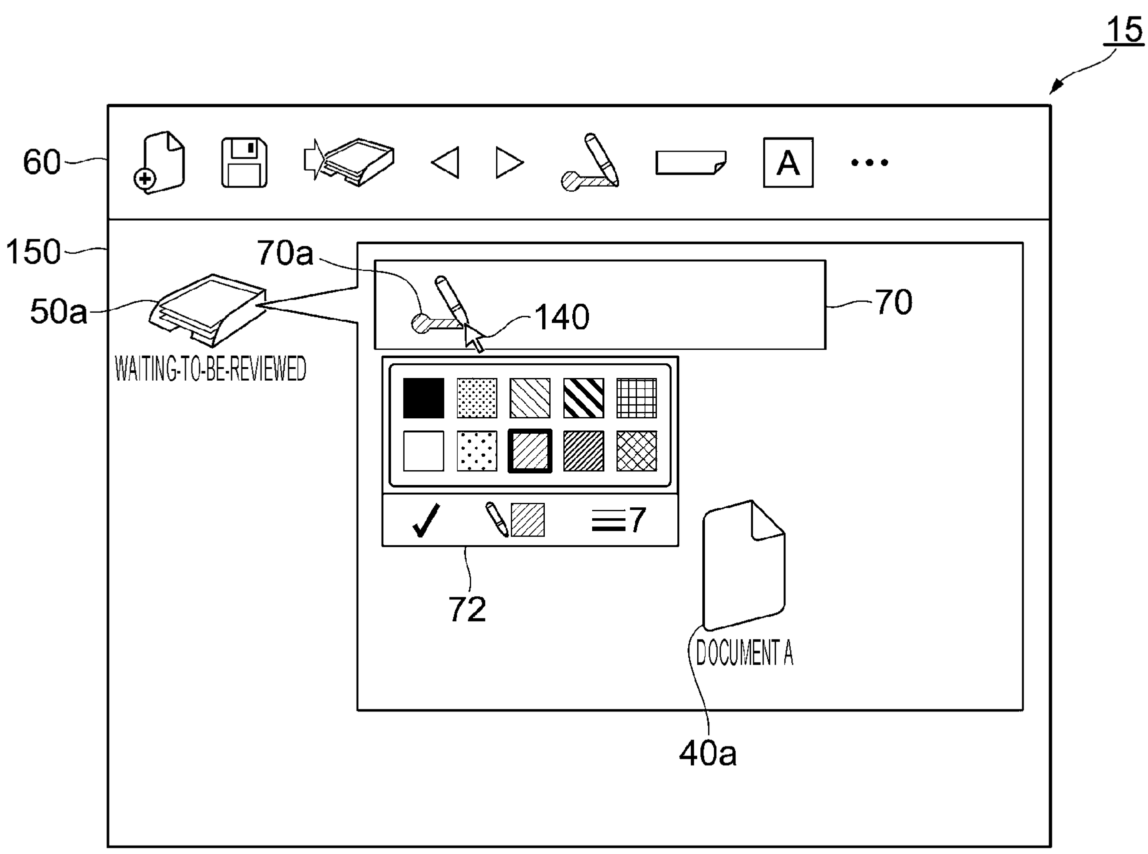
FIG. 10 illustrates addition of an attribute value to a tool.

FIG. 10 illustrates addition of an attribute value to a tool.

Figure 11A:
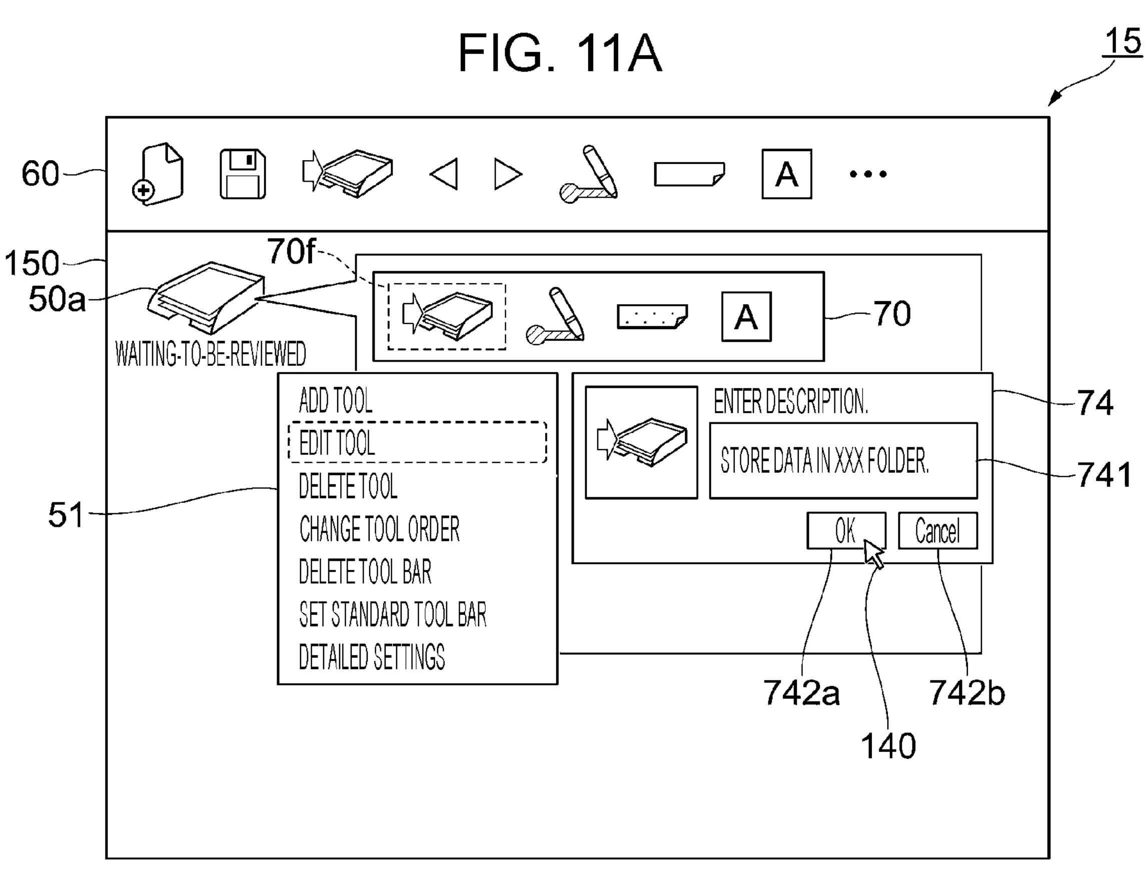
Figure 11B:
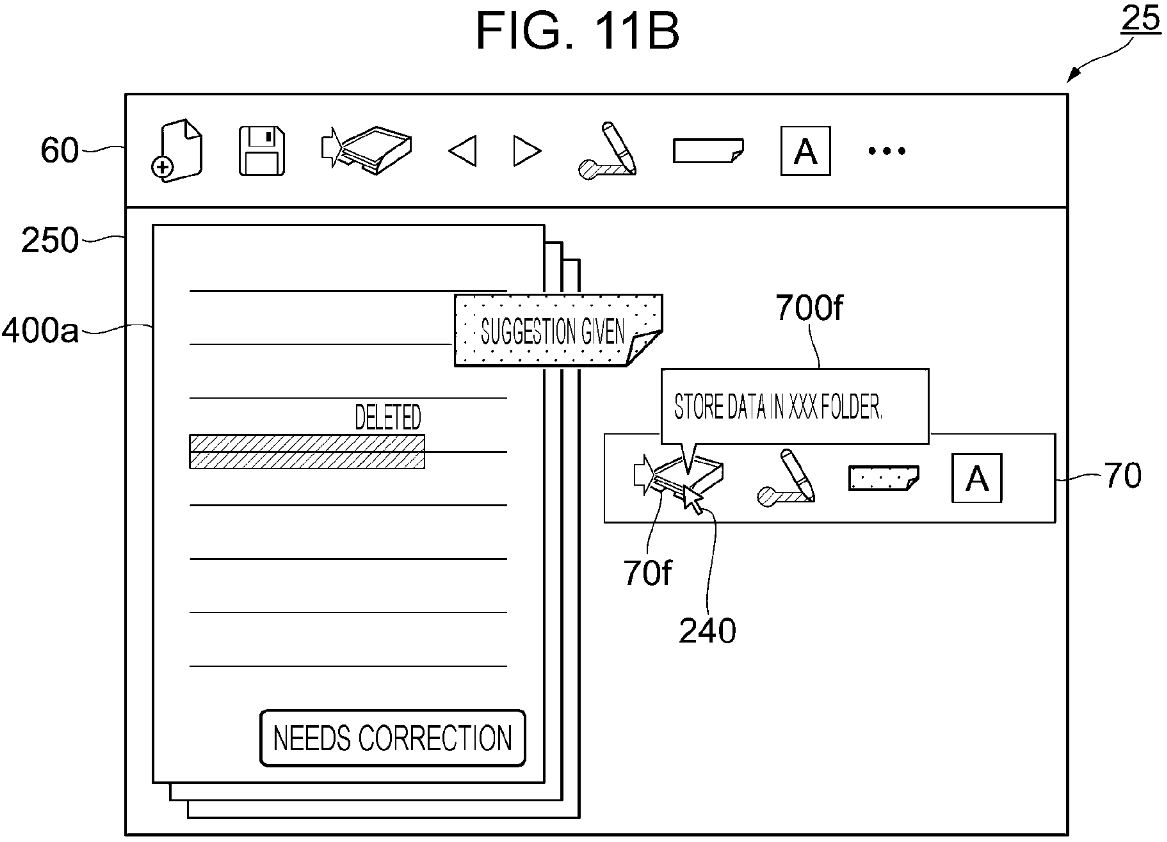

FIGS. 11A and 11B illustrate addition of a text to the tool icon 70*f*, in which FIG. 11A illustrates an example of display on the operation screen 150 at the time when the requester adds a text and FIG. 11B illustrates an example of display of a pop-up image 700*f* on the work screen 250.

In step 801, the operation determination section 112 of the requester terminal 10 determines that an operation to store the document A, which is the target document, in the "waiting-to-be-reviewed" tray icon 50*a* has been performed. In the present exemplary embodiment, as described with reference to FIG. 5B, the operation determination section 112 receives an operation to drag and drop the document icon 40*a* onto the tray icon 50*a* as an operation to store the document A. More particularly, this operation causes the communication processing section 311 to transmit the document A to the server device 30, and causes the storage location designation section 115 to designate the waiting-to-be-reviewed document folder 321 as the storage location for the document A.

The document management section 312 of the server device 30 stores the received document A in the waiting-to-be-reviewed document folder 321 which is the designated storage location (step 802).

Next, in step 803, the tool bar reception section 116 receives the designated tool bar 70 that is used to provide an instruction for a process related to the work on the document A which is the target document. More particularly, the tool bar reception section 116 receives setting for the designated tool bar 70 for the waiting-to-be-reviewed document folder 321 in which the document A is stored.

In the present exemplary embodiment, as illustrated in FIG. 9A, when the designated tool bar 70 is received, the requester makes setting with an operation menu 51 displayed. The operation menu 51 is an instruction section that is used to receive an instruction from the requester as to what setting is to be made when the designated tool bar 70 is received.

The operation menu 51 receives an instruction such as "add tool" for adding a new tool icon, "edit tool" for editing a tool icon that has already been added, "delete tool" for deleting a tool icon, "change tool order" for rearranging the order of display of tool icons, "delete tool bar" for deleting setting for the designated tool bar 70, "set standard tool bar" for setting a combination (standard tool bar) of tool icons determined in advance as the designated tool bar 70, and "detailed settings" for making the other settings related to the mode of the designated tool bar 70 etc., for example.

For example, when the requester provides an instruction "add tool", a tool addition menu 71 is displayed as illustrated in FIG. 9B. The tool addition menu 71 includes an input field 711 that is used to input a search term for searching for a tool, a search execution button 712 that is used to provide an instruction to execute a search, and a tool list 713 that indicates a list of candidates for a tool. For example, when the requester inputs "suggest" to the input field 711 and depresses the search execution button 712, candidates for a tool that is highly likely to be used to make a suggestion for the target document are displayed in the tool list 713. Then, when the requester selects a tool from the tool list 713, a tool icon corresponding to the relevant tool is added to the designated tool bar 70.

When a tool that uses an attribute value in processing is to be added, designation of the attribute value is received. The attribute value is used to determine the detailed mode of the process, such as the color or the font of the text to be inserted, the type of the image to be affixed, or the color or the shape of the figure to be drawn. For example, in the case where the tool icon 70*a* for providing an instruction for the marker process is added, as illustrated in FIG. 10, a palette 72 that is used to designate the color, thickness, etc. of a marker line 700*a* (see FIG. 6B) is displayed.

In this manner, the tool bar reception section 116 receives the designated tool bar 70 which includes a tool icon corresponding to the process (tool) designated by the requester.

Meanwhile, when "edit tool" is designated, for example, a tool icon that has already been added to the designated tool bar 70 may be edited. For example, a description menu 74 that is used to add information to the tool icon 70*f* is displayed by providing an instruction "edit tool" with the tool icon 70*f* designated as illustrated in FIG. 11A. The description menu 74 includes an input field 741 that is used to input information related to the tool icon 70*f*, and an OK button 742*a* and a cancel button 742*b* that are used to provide an instruction as to whether or not to execute addition of the input description. For example, the requester inputs description of the process to be executed in the case where the tool icon 70*f* is designated in the input field 741, and depresses the OK button 742*a*. The added description is displayed as the pop-up image 700*f* when the mouse cursor is moved over the tool icon 70*f* on the work screen 250 as illustrated in FIG. 11B.

In this manner, the tool bar reception section 116 according to the present exemplary embodiment receives setting to display, on the work screen 250, information added by the requester in association with the designated tool bar 70.

Returning to FIG. 8, in step 804, the communication processing section 113 transmits the designated tool bar 70 received by the tool bar reception section 116 to the server device 30.

The tool bar management section 313 of the server device 30 ties the designated tool bar 70 to the waiting-to-be-reviewed document folder 321 by adding the reception information, and stores the designated tool bar 70 (step 805).

Next, upon receiving a request from the requester, the worker A, B who reviews the target document performs an operation to designate the document A which is the target document using the worker terminal 20*a*, 20*b* (step 806), and requests the server device 30 to transmit the document A. The worker A, B receives a request through mail or verbal communication from the requester, for example. Alternatively, the worker A, B receives a request when the document A is stored in the waiting-to-be-reviewed document folder 321, for example.

In step 807, the document management section 312 of the server device 30 retrieves the document A from the waiting-to-be-reviewed document folder 321 in accordance with the received request. Then, the communication processing section 311 transmits the retrieved document A to the worker terminal 20*a*, 20*b*.

The storage location specifying section 214 of the worker terminal 20*a*, 20*b* specifies the storage location for the document A as the waiting-to-be-reviewed document folder 321 on the basis of the storage location information added to the document A (step 808). Then, the tool bar acquisition section 215 requests the designated tool bar 70 set to the waiting-to-be-reviewed document folder 321 from the server device 30 (step 809).

In step 810, the tool bar management section 313 of the server device 30 transmits the designated tool bar 70 in accordance with the received request.

When the designated tool bar 70 is received, the display control section 211 of the worker terminal 20*a*, 20*b* displays the designated tool bar 70 in association with the document A as illustrated in FIGS. 6A and 6B (step 811).

In reviewing the document A, the worker A, B provides an instruction for a process related to reviewing using the displayed designated tool bar 70. In this event, the document processing section 216 executes the process related to reviewing of the document A in response to the instruction (step 812).

In step 813, the worker terminal 20*a*, 20*b* receives an indication that a completion condition determined in advance has been met for the designated tool bar 70 as an instruction for a completion process. The completion process will be discussed in detail later with reference to FIGS. 12A and 12B.

Then, the worker terminal 20*a*, 20*b* executes the completion process on the basis of the instruction. In this example, storage of the document A, which is the target document, in the reviewed document folder 322 is executed as the completion process (step 814). More particularly, the document A is transmitted to the server device 30 by the communication processing section 113 with the reviewed document folder 322 designated as the storage location by the storage location designation section 217.

The server device 30 stores the received document A in the reviewed document folder 322 on the basis of an instruction from the worker terminal 20*a*, 20*b* (step 815).

When the work to review the document A which is the target document is ended in the manner described above, the process transitions to the approval work. Portions of the approval work to be described below that are similar to those of the review work will occasionally not be described in detail.

The requester acquires the target document (document A) stored in the reviewed document folder 322, corrects the target document on the basis of the review from the worker A, B, and thereafter stores the target document in the waiting-to-be-approved document tray 50*c* (step 816). The process related to this storing is similar to step 801 except that the storage location is different.

The document management section 312 of the server device 30 stores the received document A in the waiting-to-be-approved document folder 323 which is the designated storage location (step 817).

Next, the tool bar reception section 116 receives the designated tool bar 70 for the waiting-to-be-approved document folder 323 (step 818), and transmits the designated tool bar 70 to the server device 30 (step 819). The designated tool bar 70 set to the waiting-to-be-approved document folder 323 may be a tool bar that is used to provide an instruction for a process that is suitable for the approval work, and may be different from the designated tool bar 70 set to the waiting-to-be-reviewed document folder 321 in step 803.

Next, upon receiving a request from the requester, the worker C who approves the target document performs an operation to designate the document A which is the target document using the worker terminal 20*c* (step 820), and requests the server device 30 to transmit the document A.

In step 821, the server device 30 retrieves the document A from the waiting-to-be-approved document folder 323 in accordance with the received request, and transmits the document A to the worker terminal 20*c*.

The storage location specifying section 214 of the worker terminal 20*c* specifies the storage location for the document A as the waiting-to-be-approved document folder 323 on the basis of the storage location information added to the document A (step 822). Then, the tool bar acquisition section 215 requests the designated tool bar 70 set to the waiting-to-be-approved document folder 323 from the server device 30 (step 823).

In step 824, the tool bar management section 313 of the server device 30 transmits the designated tool bar 70 in accordance with the received request.

When the designated tool bar 70 is received, the display control section 211 of the worker terminal 20*c* displays the designated tool bar 70 in association with the document A (step 825).

In approving the document A, the worker C provides an instruction for a process related to approval using the displayed designated tool bar 70. Then, the document processing section 216 executes the process related to approval of the document A in response to the instruction (step 826).

In step 827, the worker terminal 20*c* receives an indication that a completion condition determined in advance has been met for the designated tool bar 70 as an instruction for a completion process. Then, the worker terminal 20*c* executes the completion process on the basis of the instruction. In this example, storage of the document A, which is the target document, in the approved document folder 324 is executed as the completion process (step 828).

The server device 30 stores the received document A in the approved document folder 322 on the basis of an instruction from the worker terminal 20*c* (step 829).

When the work to approve the document A which is the target document is ended in the manner described above, the operation for the document A as the target document is ended.

While the designated tool bar 70 is received from the requester after the target document is stored in the storage location in the example in FIG. 8, the designated tool bar 70 may be received before the target document is stored. It is only necessary that the designated tool bar 70 should be set at least before the worker terminal 20 requests the designated tool bar 70 (step 809).

In the present exemplary embodiment, the designated tool bar 70 for a storage location is received. Therefore, in the case where it is desirable to request the same work for a plurality of target documents, it is only necessary to set the designated tool bar 70 with all the documents stored in the same storage location.

[Completion Process]

Next, the completion process will be described in detail with reference to FIGS. 12A and 12B.

Figure 12A:
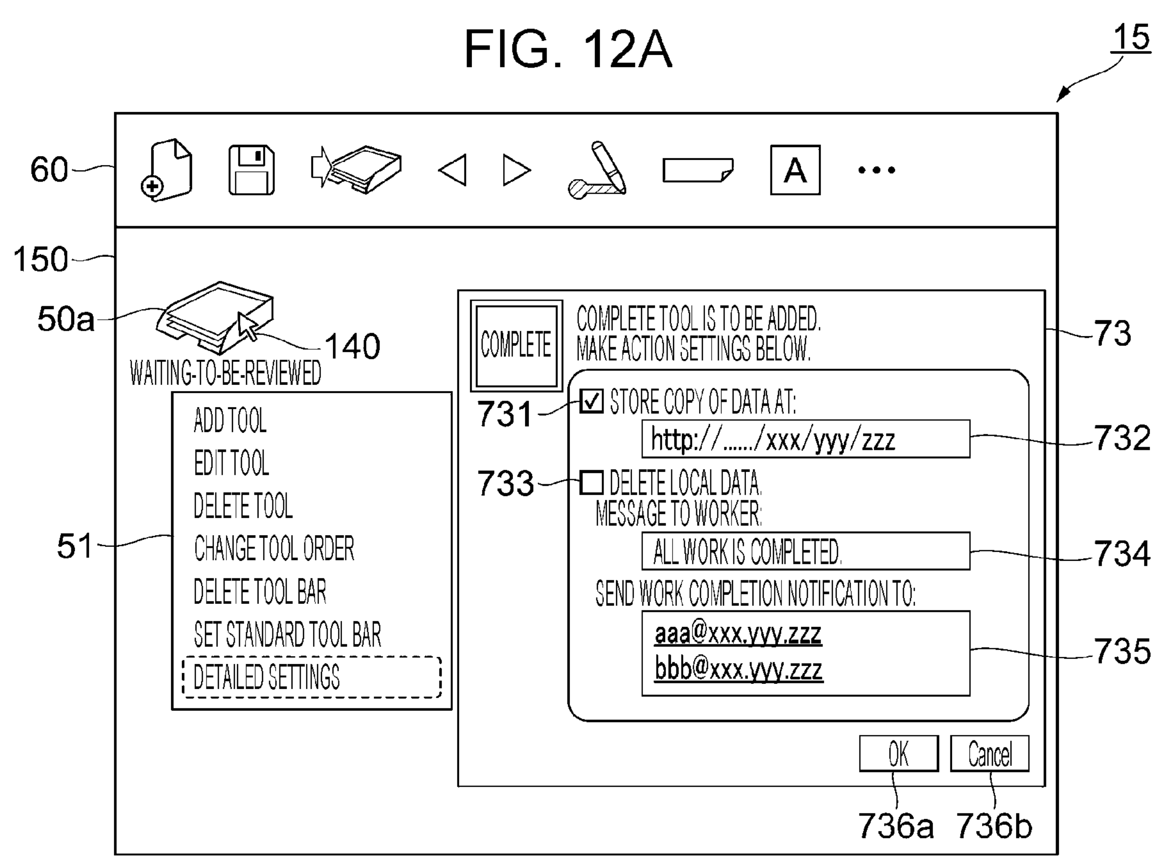
Figure 12B:
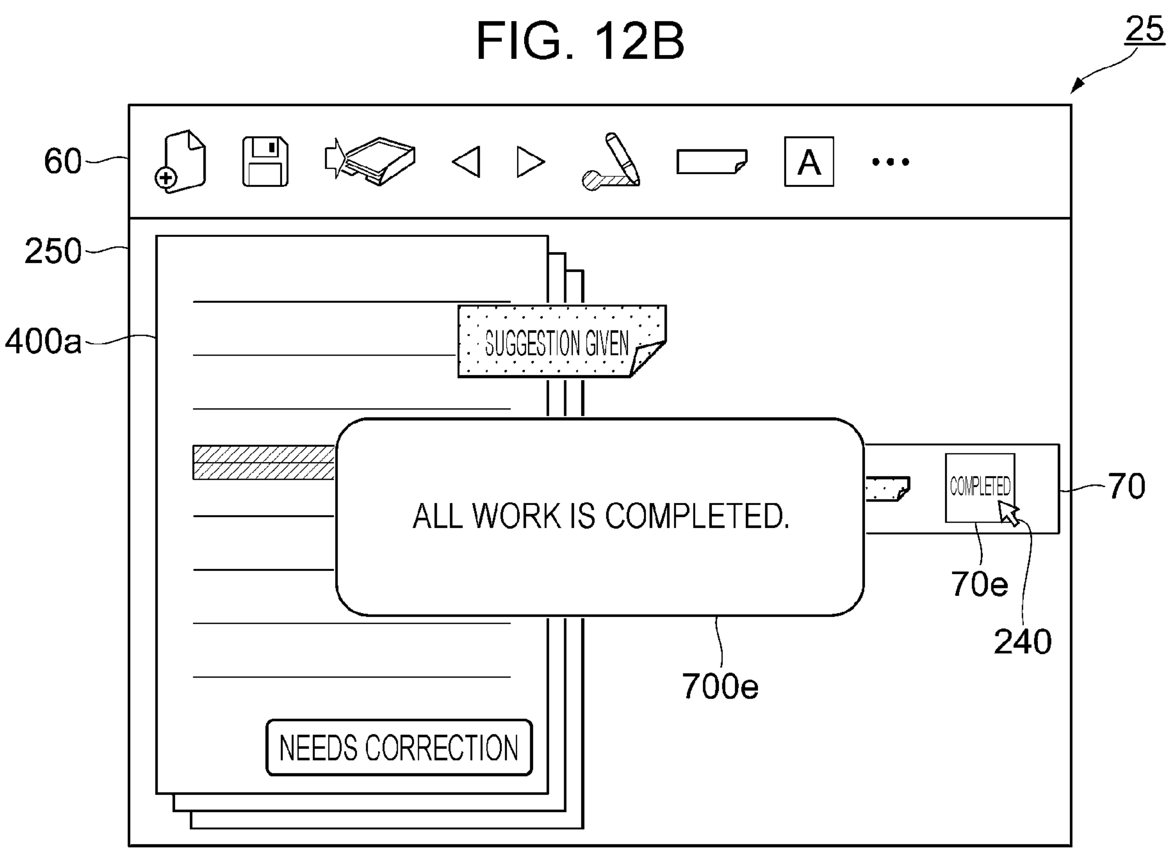

FIGS. 12A and 12B illustrate the completion process according to the present exemplary embodiment, in which FIG. 12A illustrates an example of display on the operation screen 150 at the time when setting for the completion process is made using the requester terminal 10 and FIG. 12B illustrates an example of display on the work screen 250 at the time when the completion process is executed by the worker terminal 20.

In the present exemplary embodiment, as illustrated in FIG. 8, the completion process set by the requester is executed on the basis of the fact that the completion condition determined in advance is met for the designated tool bar 70 when the work on the target document is ended. The completion condition determined in advance may be that an instruction to execute the completion process is provided using the designated tool bar 70, for example.

As illustrated in FIG. 12A, the requester causes a completion menu 73 that receives setting related to the completion process to be displayed by operating the operation menu 51 when setting for the designated tool bar 70 is made. The completion menu 73 includes a check box 731 "Store copy of data at:" that is used to make setting for a process of storing a copy of the target document in the designated storage location as the completion process, for example.

For example, in the case where it is desired that a copy of the target document that has been reviewed should be stored in the reviewed document folder 322, the requester inputs the address of the reviewed document folder 322 in an input field 732, and ticks the check box 731. In a different completion process, in the case where it is desired to delete local data on the target document in the worker terminal 20, the requester also ticks a check box 733 "Delete local data.".

In addition, a text to be displayed on the work screen 250 when the worker provides an instruction to execute the completion process is input to an input field 734, for example.

Further, the destination of a notification that the target document has been stored in the reviewed document folder 322 is input to an input field 735, for example.

As illustrated in FIG. 12B, a tool icon 70*e* that is used to provide an instruction to execute the completion process set by the requester is displayed in the designated tool bar 70 on the work screen 250. For example, the worker A who is a reviewer performs an operation to designate the tool icon 70*e* when reviewing of the target document A is completed. This operation triggers the completion process set by the requester in FIG. 12A, that is, a process of making a copy of the target document and storing the copy in the reviewed document folder 322, a process of displaying a text input to the input field 734 as the pop-up image 700*e*, and a process of notifying the notification destination input to the input field 735 that the target document has been stored in the reviewed document folder 322.

The content of the completion condition is not limited to the designation of the tool icon 70*e* in the "completion tool" described above. For example, it may be determined that the completion condition is met when all the tool icons provided in the designated tool bar 70 are designated and all the processes are executed.

While a copy of the target document is stored in the storage location designated by the requester in the completion process in the example in FIGS. 12A and 12B, this is not limiting. For example, the completion process may be a process in which original data on the target document are stored in the storage location. Alternatively, the completion process may be a process in which the designated notification destination is simply notified.

[Modifications]

Figures 13, 14:
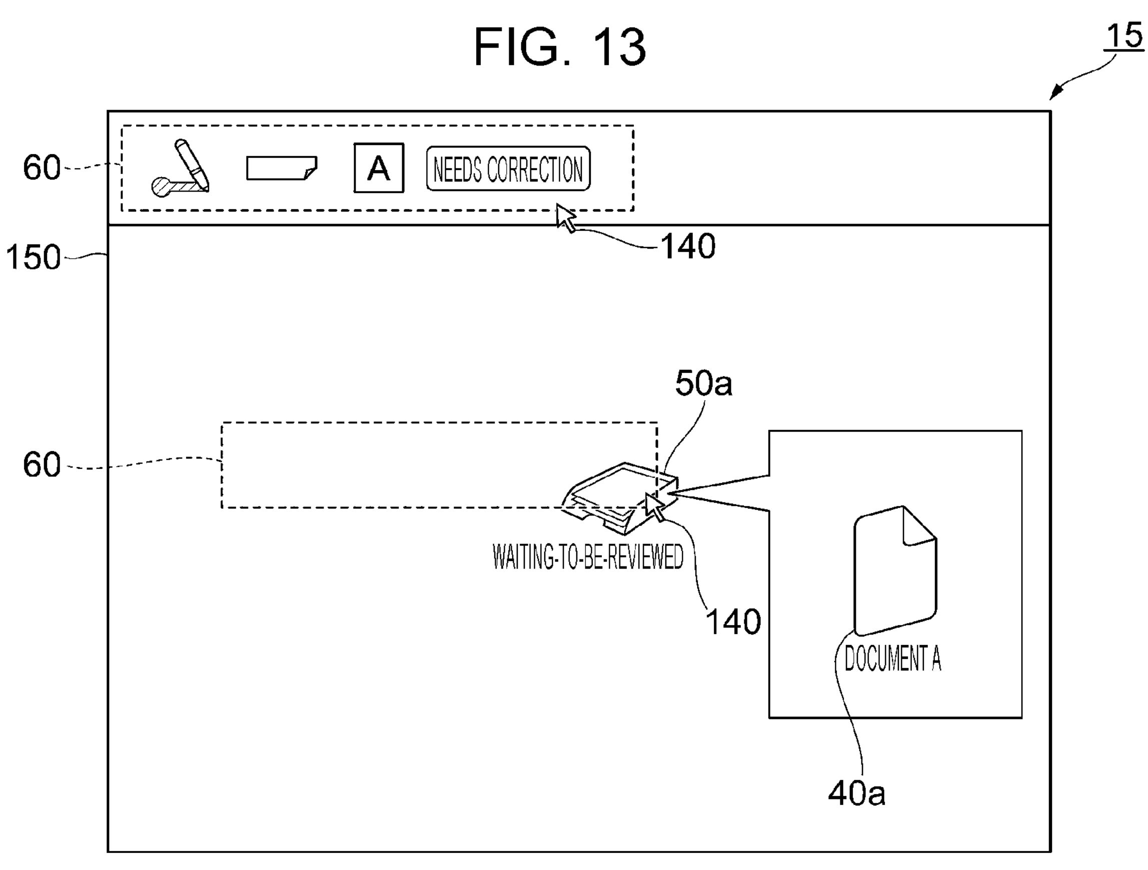
FIG. 13 illustrates a modification of reception of a designated tool bar.
FIG. 14 illustrates a management table for a case where a process is performed using different attribute values for workers.

Next, modifications of the information processing system 1 will be described with reference to FIGS. 13 to 15. FIG. 13 illustrates a modification of reception of the designated tool bar 70.

FIG. 14 illustrates a management table T1 for a case where a process is performed using different attribute values for workers.

Figure 15:
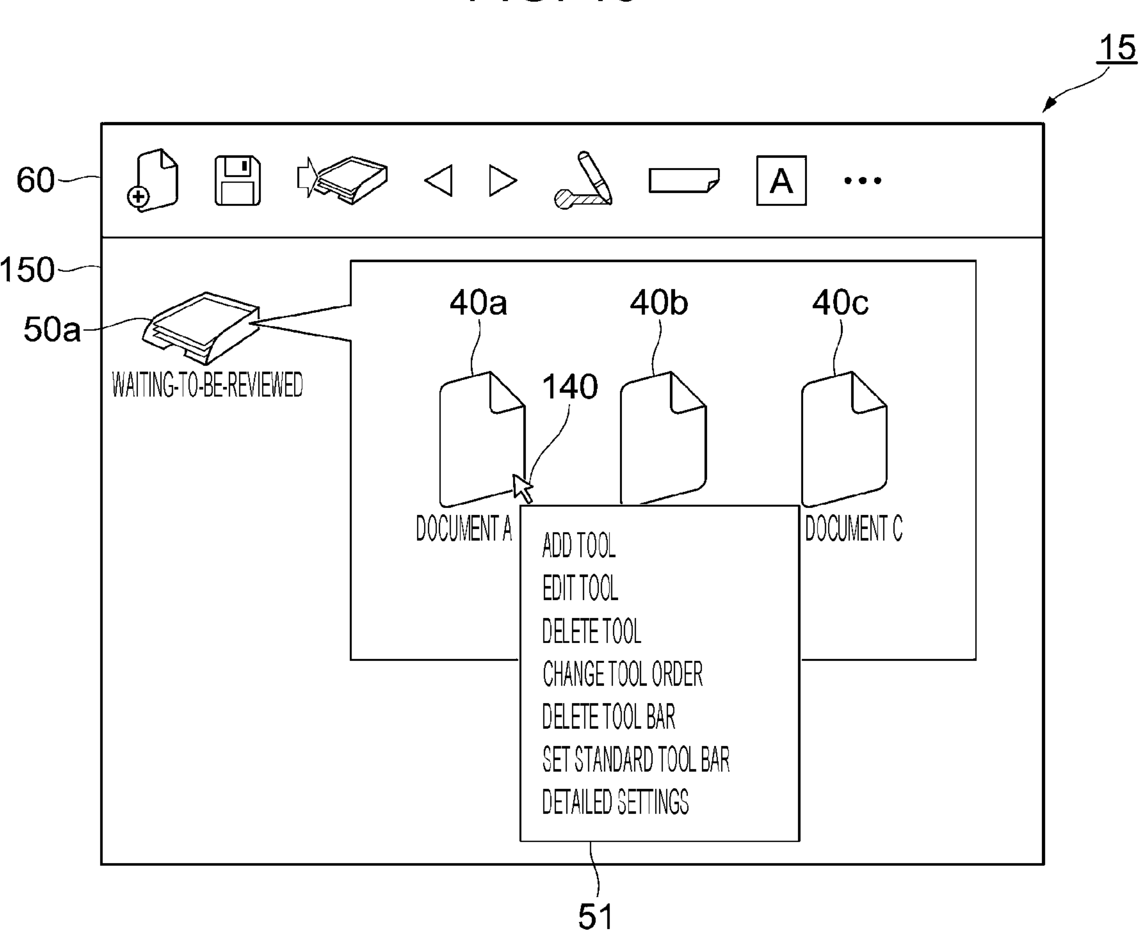
FIG. 15 illustrates reception of a designated tool bar for a target document.

FIG. 15 illustrates reception of the designated tool bar 70 for the target document.

While the operation menu 51 (see FIG. 9A) is displayed to receive setting when the requester terminal 10 receives the designated tool bar 70 in the present exemplary embodiment described above, an operation to set the default tool bar 60 as the designated tool bar 70 may be received. For example, the default tool bar 60 may be received as the designated tool bar 70 by dragging and dropping the default tool bar 60 onto the tray icon 50*a* as illustrated in FIG. 13. In addition, only some of the tool icons provided in the default tool bar 60 may be included in the designated tool bar 70 by dragging and dropping only the relevant tool icons.

In order to suppress work that is not intended by the requester, execution of a process that is different from the process designated by the requester may be restricted in the worker terminal 20. In a specific example, an instruction for a process from an element other than the designated tool bar 70 may be restricted.

For example, in the present exemplary embodiment, both the default tool bar 60 and the designated tool bar 70 are displayed, and therefore there is a possibility that an instruction for a process from the default tool bar 60 is performed and work that is not intended by the requester is performed. Thus, the default tool bar 60 may be hidden in the case where the designated tool bar 70 is displayed. Alternatively, an instruction for a process from the default tool bar 60 may not be received.

A process may be performed using different attribute values for a plurality of workers when the workers work on the same target document.

In a specific example, when setting the designated tool bar 70, the requester transmits, to the server device 30, setting in which the color to be used for a tagging process to be performed using the tool icon 70*b* is set to a template variable "@@@Annotation Color@@@". When the designated tool bar 70 is requested from the worker terminal 20*a*, the server device 30 determines the color #xxxxxx for the tagging process on the basis of the template variable, and transmits the designated tool bar 70 to which this setting has been applied. Similarly, when the designated tool bar 70 is requested from the worker terminal 20*b*, the server device 30 determines the color #yyyyyy for the tagging process, and transmits the designated tool bar 70 to which this setting has been applied. When the worker A performs the work using the worker terminal 20*a*, a process of adding a tag image 700*b* in color #xxxxxx to the target document is performed by designating the tool icon 70*b*. When the worker B performs the work using the worker terminal 20*b*, meanwhile, a process of adding a tag image 700*b* in color #yyyyyy is performed by designating the tool icon 70*b*.

As illustrated in a management table T1 in FIG. 14, the server device 30 stores and manages identification information such as IP addresses for identifying the worker terminals and determined attribute values. When the designated tool bar 70 is requested from the worker terminals 20*a*, 20*b*, and 20*c* the next and subsequent times, the server device 30 references the identification information and the management table T1, and transmits the designated tool bar 70 which performs a tagging process using the same attribute values as those determined initially.

While the designated tool bar 70 for the storage location is received in the present exemplary embodiment described above, the designated tool bar 70 for the target document may be received. For example, the operation menu 51 may be displayed by an operation to designate the document A, which is the target document, to receive the designated tool bar 70 for the document A as illustrated in FIG. 15. In this aspect, the designated tool bar 70 is transmitted in association when the document A is transmitted, and the designated tool bar 70 is displayed on the requester terminal 10.

In an aspect in which the designated tool bar 70 for the target document is received and the target document is transmitted for storage in the storage location, further, the designated tool bar 70 is preferably received after the target document is stored. In an operation that involves transfer of a document, the person who transmits the target document and the requester who requests work are occasionally different from each other. If the designated tool bar 70 is received before the target document is stored, it is necessary that the terminal that performs a process of storing the target document and the terminal that receives the designated tool bar 70 should be the same as each other, which is not convenient. By receiving the designated tool bar 70 after the target document is stored as described above, the process of storing the target document and the process of receiving the designated tool bar 70 may be performed by different devices.

The process performed by the requester terminal 10, the process performed by the worker terminals 20, and the process performed by the server device 30 according to the present exemplary embodiment are prepared as programs such as application software, for example. The programs may be not only provided by a communication unit but also provided as stored in a storage medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:

a server device that provides a storage location;

a requester terminal that receives, from a requester, a first designated tool bar that is used to perform a first process related to work on a target document to be worked on and transmits the first designated tool bar and the target document to the server device; and a worker terminal that receives the first designated tool bar and the target document from the server device and displays the first designated tool bar on a work screen on which a worker performs the first process related to the work on the target document by using the first designated tool bar, wherein the worker terminal transmits a first-processed target document, which is the target document in which the first process has been performed thereon, to the server device, wherein the requester terminal further receives, from the requester, a second designated tool bar that is used to perform a second process related to work on the first-processed target document to be worked on and transmits the second designated tool bar to the server device, and wherein the server device transmits the first-processed target document and the second designated tool bar to another worker terminal that receives the first-processed target document and the second designated tool bar on another work screen on which another worker performs the second process related to the work on the first-processed target document by using the second designated tool bar.

2. The information processing system according to claim 1, wherein the worker terminal restricts execution of a process that is not designated by the requester.

3. The information processing system according to claim 2, wherein the worker terminal;

hides the second designated tool bar when the first designated tool bar is displayed on the work screen.

4. The information processing system according to claim 1, wherein the requester terminal receives setting for displaying, on the work screen and in association with the first designated tool bar, information added by the requester.

5. The information processing system according to claim 1, wherein the worker terminal displays, on the work screen and in association with the target document, information indicating that the first designated tool bar has been received.

6. The information processing system according to claim 1, wherein the requester terminal adds different attribute values to a plurality of workers, and the worker terminal executes the first process related to the work using the attribute values.

7. The information processing system according to claim 1, wherein the requester terminal receives, from the requester, setting for a completion process which is a process for the target document on which the work has been performed, and the worker terminal performs the completion process when a completion condition determined in advance is met for the first designated tool bar.

8. The information processing system according to claim 7, wherein the completion process is a process of storing the target document on which the work has been performed in the storage location designated by the requester.

9. The information processing system according to claim 1, wherein the another worker terminal transmits a second-processed target document, which is the first-processed target document in which the second process has been performed thereon, to the server device.

10. The information processing system according to claim 1,
wherein the first process is to review the target document, and
wherein the second process is to approve the first-processed target document.

11. An information processing apparatus comprising:
a processor configured to:
receive a first designated tool bar that is used to perform a first process related to work on a target document to be worked on;
transmit the first designated tool bar and the target document to a server device that provides a storage location,
wherein the first designated tool bar is displayed on a device, that receives the first designated tool bar and the target document from the server device, on which the first process related to the work is performed on the target document, the device being different from the information processing apparatus,
wherein a first-processed target document, which is the target document in which the first process has been performed thereon, is transmitted from the device to the server device; and
receive a second designated tool bar that is used to perform a second process related to work on the first-processed target document to be worked on and transmit the second designated tool bar to the server device,
wherein the first-processed target document and the second designated tool bar are transmitted from the server device to another device, that receives the first-processed target document and the second designated tool bar, on which the second process related to the work is performed on the first-processed target document by using the second designated tool bar.

12. A non-transitory computer readable medium storing a program causing a computer to execute a process comprising:
receiving a first designated tool bar that is used to perform a first process related to work on a target document to be worked on;
transmitting the first designated tool bar and the target document to a service device that provides a storage location;
wherein the first designated tool bar is displayed on a device, that receives the first designated tool bar and the target document from the server device, on which the first process related to the work is performed on the target document, the device being different from the information processing apparatus,
wherein a first-processed target document, which is the target document in which the first process has been performed thereon, is transmitted from the device to the server device; and
receiving a second designated tool bar that is used to perform a second process related to work on the first-processed target document to be worked on and transmitting the second designated tool bar to the server device,
wherein the first-processed target document and the second designated tool bar are transmitted from the server device to another device, that receives the first-processed target document and the second designated tool bar, on which the second process related to the work is performed on the first-processed target document by using the second designated tool bar.

13. An information processing system comprising:
storage means for providing a storage location;
requester means for receiving, from a requester, a first designated tool bar that is used to perform a first process related to work on a target document to be worked on and transmitting the first designated tool bar and the target document from the storage means; and
worker means for receiving the first designated tool bar and the target document from the storage location and displaying the first designated tool bar on a work screen on which a worker performs the first process related to the work on the target document,
wherein the worker means transmits a first-processed target document, which is the target document in which the first process has been performed thereon, to the storage means,
wherein the requester means further receives, from the requester, a second designated tool bar that is used to perform a second process related to work on the first-processed target document to be worked on and transmits the second designated tool bar to the storage means, and
wherein the storage means transmits the first-processed target document and the second designated tool bar to another worker means that receives the first-processed target document and the second designated tool bar on another work screen on which another worker performs the second process related to the work on the first-processed target document by using the second designated tool bar.

* * * * *